(12) United States Patent
Richards

(10) Patent No.: US 7,178,248 B2
(45) Date of Patent: Feb. 20, 2007

(54) POWER TOOL

(75) Inventor: Gareth Richards, Spennymoor (GB)

(73) Assignee: Black & Decker Inc., Newark, DE (US)

( * ) Notice: Subject to any disclaimer, the term of this patent is extended or adjusted under 35 U.S.C. 154(b) by 216 days.

(21) Appl. No.: 10/462,908

(22) Filed: Jun. 17, 2003

(65) Prior Publication Data

US 2004/0035009 A1 Feb. 26, 2004

(30) Foreign Application Priority Data

Jun. 19, 2002 (GB) .................................. 0214035.8

(51) Int. Cl.
*B25G 1/00* (2006.01)

(52) U.S. Cl. ........................... 30/520; 30/210; 30/216; 30/232; 30/312; 30/340

(58) Field of Classification Search ................. 30/210, 30/216, 206, 228, 232, 381, 382, 514, 520, 30/312; 16/408, 409
See application file for complete search history.

(56) References Cited

U.S. PATENT DOCUMENTS

| | | | | | |
|---|---|---|---|---|---|
| 2,763,492 | A | * | 9/1956 | Phelps | 280/47.36 |
| 4,785,540 | A | * | 11/1988 | Arvidsson | 30/520 |
| 4,841,641 | A | | 6/1989 | Laidlaw | |
| 5,065,476 | A | * | 11/1991 | Dohse et al. | 16/426 |
| 5,150,523 | A | * | 9/1992 | McCurry | 30/228 |
| 5,570,512 | A | * | 11/1996 | Hoppner | 30/383 |
| 5,687,483 | A | * | 11/1997 | Neubert et al. | 30/312 |
| 5,697,258 | A | * | 12/1997 | Aiyama | 74/491 |
| 6,178,642 | B1 | * | 1/2001 | Schaer | 30/216 |
| 6,701,622 | B2 | * | 3/2004 | Covell et al. | 30/216 |
| 6,912,790 | B2 | * | 7/2005 | James et al. | 30/392 |

FOREIGN PATENT DOCUMENTS

| | | | |
|---|---|---|---|
| DE | 28 16 485 A1 | * | 10/1979 |
| DE | 29 09 777 A1 | * | 9/1980 |
| EP | 0 696 419 A1 | | 2/1996 |
| EP | 0 750 837 A1 | | 1/1997 |
| EP | 1 020 257 A1 | | 7/2000 |

* cited by examiner

*Primary Examiner*—Boyer D. Ashley
*Assistant Examiner*—Carolyn Blake
(74) *Attorney, Agent, or Firm*—John Yun; Bruce S. Shapiro; Wesley W. Muller

(57) ABSTRACT

A power tool (10) comprises a main body (12) having a motor driven tool (24) extending from a first front end of the main body, and has a first handle (18) integrally formed on the main body to be remote from this front end. A second support handle (20) is pivotally mounted on the tool body (12) to be pivotally displaceable about a pivot axis (34) so as to be displaceable from a first position in which a grip (22) of the support handle is disposed forwards of the first handle (18), to a second position wherein the grip member (22) is disposed rearwardly of the first handle (18). Also disclosed is the use of restraining means engageable between the support handle (20) and the main body (12) for releasably restraining the handle in either of the first or second positions. Further disclosed is a dual switching mechanism requiring operation of a switch on the main handle (18) and also on the grip (22) of the support handle (20) to allow operation of the tool, irrespective of whether the handle (20) is in its first or second position.

42 Claims, 13 Drawing Sheets

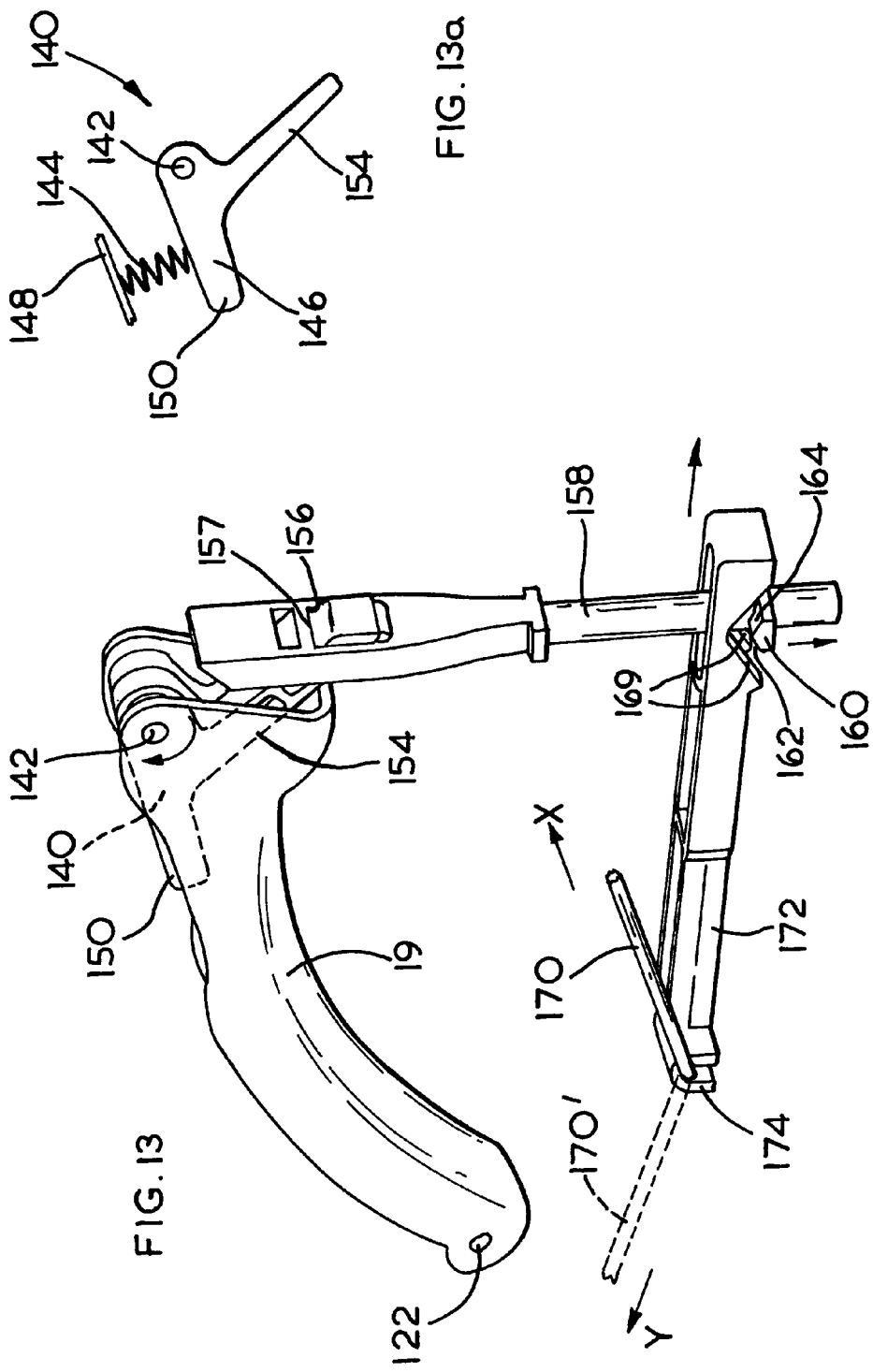

POWER TOOL

FIELD OF THE INVENTION

This application claims priority from the United Kingdom patent application 0214035.8 filed on Jun. 19, 2002, the entirety of which is incorporated herein by reference.

BACKGROUND OF INVENTION

The present invention is directed towards a power tool, and more particularly to an electrically operated portable power tool having two handles for two handed operation by the user. This invention is of considerable benefit for use with power tools used for cutting operations such as hedge trimmers, electric saws and chainsaws.

Many forms of power tool are known to utilise a primary handle, usually having a trigger switch mounted thereon for operation by the user, and a second support handle to allow two handed operation of the power tool to provide greater stability in use. Examples of power tools in utilising secondary support handles in this manner include power drills, chainsaws and hedge cutters where the mode of operation of such tools often generates considerable reaction forces such that additional stability of the tool is desirable and thus achieved by allowing the operator to use two hands to support such tools. However, such power tools utilising two handles are limited to close quarters operation by a user due to the usual close proximity between the primary and support handles which, whilst providing the required additional stability for close quarters work, makes such tools difficult to use where the operator is required to use the tools in situations where they are to be maintained at arms length. For example, where the operator would need to stretch for the tool to engage the workpiece, as is commonly encountered when using hedge trimmers, whereby it is often required for the user to stretch the tool out at arms length to engage remote parts of the hedge being cut, often resulting in the operator reverting to one handed use of the tool, a function which is usually prevented by the incorporation of safety devices requiring switch elements to be operated on both handles simultaneously. This often necessitates the only solution being available to the operator being to position himself closer to the workpiece being operated on, which can be impractical.

Furthermore, whilst attempts to address this issue have involved the provision of extension handles to be releasably attached to such tools to increase their stability, this has failed to address the dual switching function employed by such tools and also provides additional cost and storage problems associated with "addon" components. Dual switching requiring the operator to effect actuation of two separate switches, one on each handle, to operate the tool— thereby ensuring that the operator is correctly holding the tool to be able to actuate such switches simultaneously.

It is therefore an object of the present invention to provide a power tool which alleviate these aforementioned problems.

SUMMARY OF THE INVENTION

According to the present invention there is now provided a power tool comprising a main body housing a motor and tool drive assembly, a tool connected to the tool drive assembly and extending from a first front end of the main body, a first handle integrally formed on this main body so as to be remote from the front end, and restrained from displacement relative thereto, together with a second support handle, having a grip member, mounted on and displaceable relative to the tool body, wherein the support handle is pivotally mounted on this main body about a pivot axis so as to be pivotally displaceable from a first position wherein the grip member is disposed forwards of the first handle, to a second position wherein the grip member is disposed rearwardly of this first handle. Thus allowing the support handle to act as an extension handle in its second position.

Preferably, the power tool will further comprise restraining means which are engageable between the support handle and the main body for releasably restraining the support handle in either the first or second positions. These restraining means will usually comprise a first restraint means for restraining the handle in the first position and a second restraint means, remote from the first restraint means, for restraining the handle in the second position, each of which are independent of one another. Preferably, at least one of the first or second restraint means will comprise a first engagement member mounted on one of the tool body or support handle, and being resiliently biased into engagement with a second engagement member on the other of the tool body or support handle. More often both restraint means will comprises such first and second engagement members.

It is preferred that at least one of these first and second restraint means will comprise an actuation member for co-operation with the first engagement member which, when actuated, will effect displacement of the first engagement member, against its resilient biasing, out of engagement with the second engagement member. Here, the actuation member may be mounted on the other of the tool body or support handle on which the first engagement member is mounted. Alternatively, this actuation member may be mounted on the one of said tool body or support handle on which said first engagement means is mounted. It is also envisaged that the actuation member may be formed integral with the first engagement member, particularly where this first engagement member is pivotally mounted.

It is preferred that the first engagement member will comprise one of a shoulder or a projection member and the second engagement member will then comprise the other of this shoulder or projection member, for co-operative engagement between this projection and shoulder. Furthermore, the second engagement member may then comprise a deflecting means for engagement with the first engagement member as the support handle is pivoted relative to the main body from a non restrained position to a restrained position, whereby such engagement will effect displacement of the first engagement member against its resilient biasing and out of the relative pivotal displacement path of the other of the support handle or main body, until the shoulder and projection member are aligned to allow co-operating engagement there between.

Usually, at least one of said first and second restraint means will have associated therewith a first stop member mounted on the support handle for abutment with a second stop member on the tool body, wherein abutment of these first and second stop members, at a predetermined position of the support handle relative to the body will restrain the handle from continued pivotal displacement about the body in one direction and effects alignment between the first and second engagement members, thereby providing a simple mechanical method of aligning the handle at its preferred first or second position, such that the restraining means are engaged. These stop members may also be adjustable to increase the number of set positions of the handle.

It is further preferred that the restraining means be engageable between the support handle and the main body remote from the pivot axis. Here, the first restraint means may be engageable between the support handle and the main body at a position forward of the pivot axis and the second restraint means may be engageable between the support handle and the main body in a position rearward of the pivot axis.

Preferably, the first handle will comprise a manually operable trigger switch engageable with an electrical switch to provide power to the motor, as is conventional for power tools.

However, the power tool will also preferably comprising a two handed switching mechanism for facilitating operation of the electrical switch.

Here, the trigger switch will usually comprise a displaceable switch member for effecting engagement between the trigger switch and the electrical switch, which displaceable switch member being displaceable from a biased, inoperative position, whereby it is selectively restrained from engagement with the electrical switch during operation of the trigger switch, to an operative position in which it is engageable with this electrical switch during operation of said trigger switch. It is usual that this displaceable switch member pivotally mounted on the trigger switch, and biased to its inoperative position by a spring member. Usually in such an inoperative position, the displaceable switch member is restrained from projection out of the trigger switch.

Usually, the power tool will have a dual switching mechanism, such dual switching mechanism preferably comprising the trigger switch and also a secondary switch member, which is remote from the trigger switch, this secondary switch member being manually displaceable from a first unactuated position to a second actuated position, such that the secondary switch member co-operates with the trigger switch so as to facilitate engagement between the trigger switch and the electrical switch when the secondary switch member is in an actuated position.

This secondary switch member will usually co-operate with the displaceable switch member to displace this displaceable switch member from its inoperative position to its operative position when the secondary switch member is displaced from its unactuated position to its actuated position.

Alternatively, this dual switching mechanism may comprise a lock-off member for co-operating engagement with the trigger switch to restrain such trigger switch from displacement when the secondary switch is in an unactuated position, wherein such a lock-off member may be displaceable out of engagement with the trigger switch when the secondary switch member is in an actuated position.

Preferably, this secondary switch member will be mounted on the support handle and will be maintained in co-operation with the trigger switch when the handle is in both the first and second position relative to the tool body. Here, the dual switching mechanism may comprise a first force transmission means in the support handle which is maintained in communication with the secondary switch member, and further comprise a secondary force transmission means in the body which is maintained in communication with the trigger switch, wherein a link element connected between and for effecting transfer of an actuation force from the first transmission means to the second transmission means extends between the support handle and the body so as to be co-axial with the pivot axis.

It is preferred that the secondary force transmission means will comprise an elongate cam member which is displaceable in either a first or second transverse direction with respect to the pivot axis and in response to the transfer of an actuation force by the link element, which has been generated by actuation of the secondary switch member.

This cam member may be displaceable in the first direction in response to an actuation force from the secondary switching member when the support handle is in a first position and may be displaceable in the second direction in response to an actuation force from the secondary switching member when the support handle is in its second position. Here the dual switching mechanism may then comprise a cam follower member biased into engagement with a cam surface of the cam member, wherein cam engagement therebetween as the cam member is displaced, will effect cam displacement of this cam follower means in the same direction irrespective of whether the cam member is displaced in said first or second direction. Usually the cam follower will extend perpendicular to the direction of movement of the cam member such that it will be displaced away from the cam member irrespective of which way the cam member is displaced. This is preferably achieved by providing a symmetrical cam surface, usually having a V shaped profile.

It is usually the cam follower means which will then co-operate with the trigger switch and, more particularly, with the displaceable switch member mounted on that trigger switch.

Usually, the said cam follower member will be displaceable, in response to the cam engagement with the cam member, from a rest position in which it is restrained from active engagement with the displaceable switch member, into a second active position so as to engage with and effect displacement of this displaceable switch member into an operative position. The displaceable switch member will preferably be L-shaped, having a first free end for engagement with the electrical switch and an opposed free end thereof for engagement with this cam follower member. The cam follower member will preferably have an elongate slot for receiving this opposed free end of the displaceable switch member so as to be freely displaceable within such slot when the cam follower member is in its rest position, and which elongate slot may also comprise a shoulder which engages this opposed end when in the second, active position to thereby restrain movement of the opposed end relative thereto, thus effecting pivotal displacement of the L-shaped switch about its pivot axis as the trigger switch is subsequently displaced.

In an alternative embodiment, the cam member may co-operate directly with said trigger switch.

Preferably, the tool drive assembly will have a linear reciprocating output for driving a cutting element, usually where the power tool is a hedge trimmer. Alternatively, the power tool could comprise a chain saw.

According to a further aspect of the present invention there is also provided a power tool comprising a main body housing a motor and tool drive assembly, wherein a tool is connected to this tool drive assembly to extending from a first front end of this main body, the tool further comprising a first handle integrally formed on the main body remote from the front end and restrained from displacement relative thereto, also having a second support handle, having a grip member, pivotally mounted about a pivot axis on this tool body so as to be pivotally displaceable relative thereto, wherein the support handle comprises a switch member displaceable from an unactuated position to an actuated position, with this switch member being maintained in mechanical co-operation with a switch engagement means within the body which itself co-operates with a switching mechanism on the body, whereby displacement of the switch member on the support handle effects mechanical displacement of the switch engagement means, irrespective of the pivotal position of the support handle, whereby the mechanical co-operation is effected by a link element extending between the support handle and the body so as to be co-axial with the pivot axis. Preferably, the switch member will comprise a first force transmission means in the support handle, and the switch engagement means will comprise a second force transmission means in the body, wherein the link element extends between these first and second force transmission means.

BRIEF DESCRIPTION OF THE DRAWINGS

A preferred embodiment of the present invention will now be described, by way of example only, with reference to the accompanying illustrative drawings in which:

FIG. 13 is an enlarged perspective view of a trigger switch and exploded switching mechanism of the hedge trimmer of FIG. 1; and FIG. 13a is a schematic illustration of a pivotally displaceable switch member of the switching mechanism of FIG. 13.

DETAILED DESCRIPTION OF THE PREFERRED EMBODIMENTS

Figure 1:
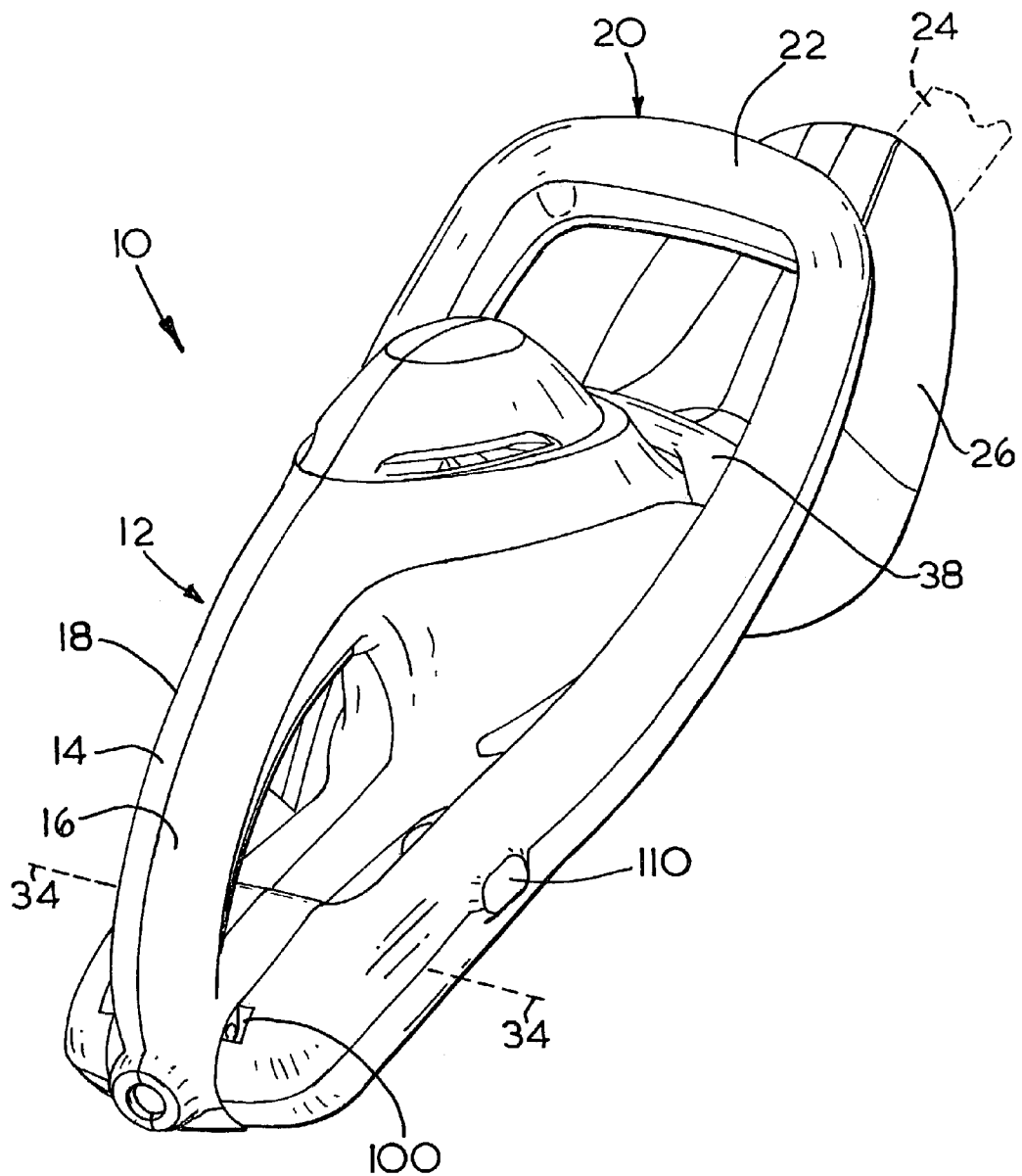
FIG. 1 is a rear perspective view of a hedge trimmer according to the present invention having a support handle in a first operative position.
Figure 2:
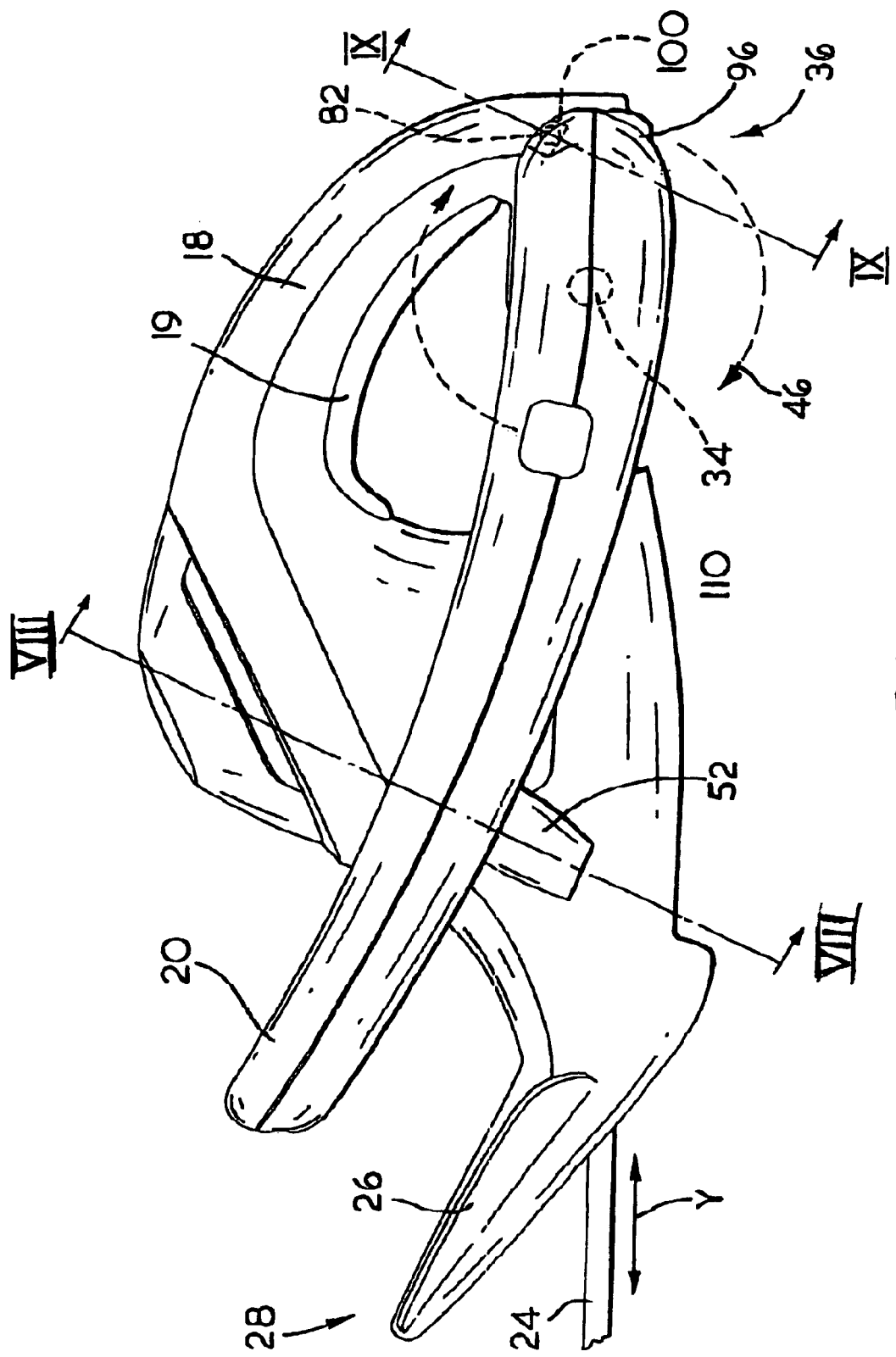
FIG. 2 is a side elevation of the hedge trimmer of FIG. 1 with the handle in the first operative position.

Referring now to FIG. 1, an electric power tool which, in this preferred embodiment is an electric hedge trimmer (10) is shown. As is conventional, the hedge trimmer comprises a main body (12) formed from two plastics moulded clamshells which are substantially symmetrical. Each of the clamshells (14, 16) are screwed together to form the body (12). The body is provided with an integrally formed conventional D shaped primary handle member (18) having a conventional trigger switch (19) (FIG. 2). In this manner, an operator using the hedge trimmer (10) will be able to grasp this primary handle (18) in order to operate the tool whilst the grip provides convenient access by the users fingers to simultaneously activate trigger switch (19) to apply power to the tool in a conventional manner.

For many types of power tools, a secondary handle is also required to allow a user two handed operation of the tool for increased stability. This is particularly beneficial in heavier tools or those used for cutting operations, whereby a high degree of movement and control is required of the product. For the present invention, the hedge trimmer (10) is further provided with a secondary support handle (20) having a grip member (22) which can be grasped by the users other hand so as to allow two handed operation of the hedge trimmer in a conventional manner, where the users grasp of this forward extending grip portion (22) allows the user to more accurately guide and support the cutting tool in operation.

As shown schematically in FIG. 1 and FIG. 2, the hedge trimmer (10) is provided with an elongate cutting member (24), usually in the form of a pair of reciprocating blade members, which are driven by a motor and drive mechanism housed within the body of the tool (10) (but not shown herein) so as to oscillate with a linear reciprocating motion shown generally by the arrow Y in FIG. 2. Since the use of reciprocating linear blades is well known and understood, together with the use of a conventional electric motor with an appropriate rotary to linear drive conversion mechanism, such features will not be described in any detail here as these are considered standard background art and well known to those skilled in the art.

Formed towards the front of the body (12) of this hedge trimmer is a guard member (26). The front of the tool defined as the part from which the tool (24) extends.

Figure 3:
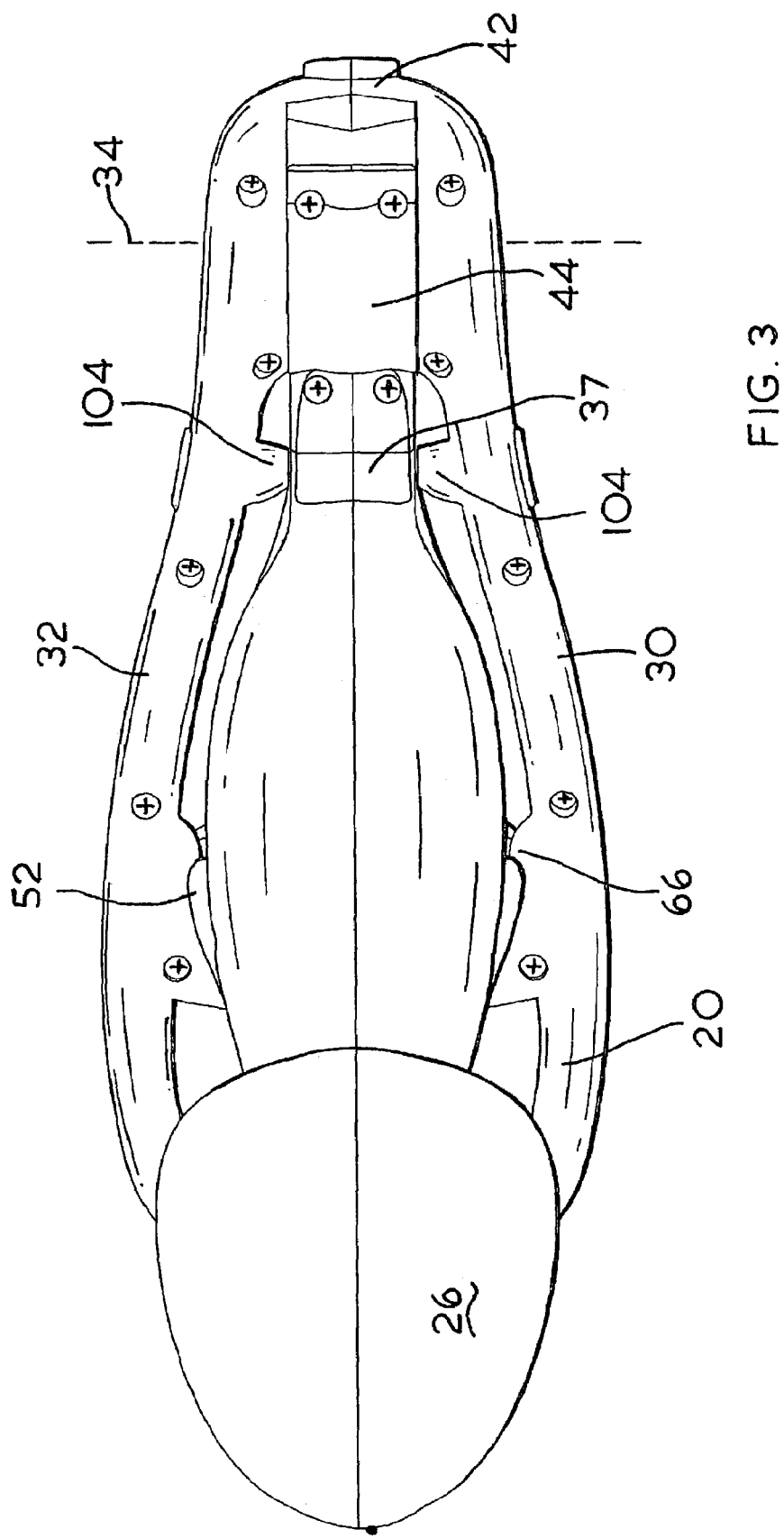
FIG. 3 is a plan view from below of the hedge trimmer of FIG. 1.
Figure 4:
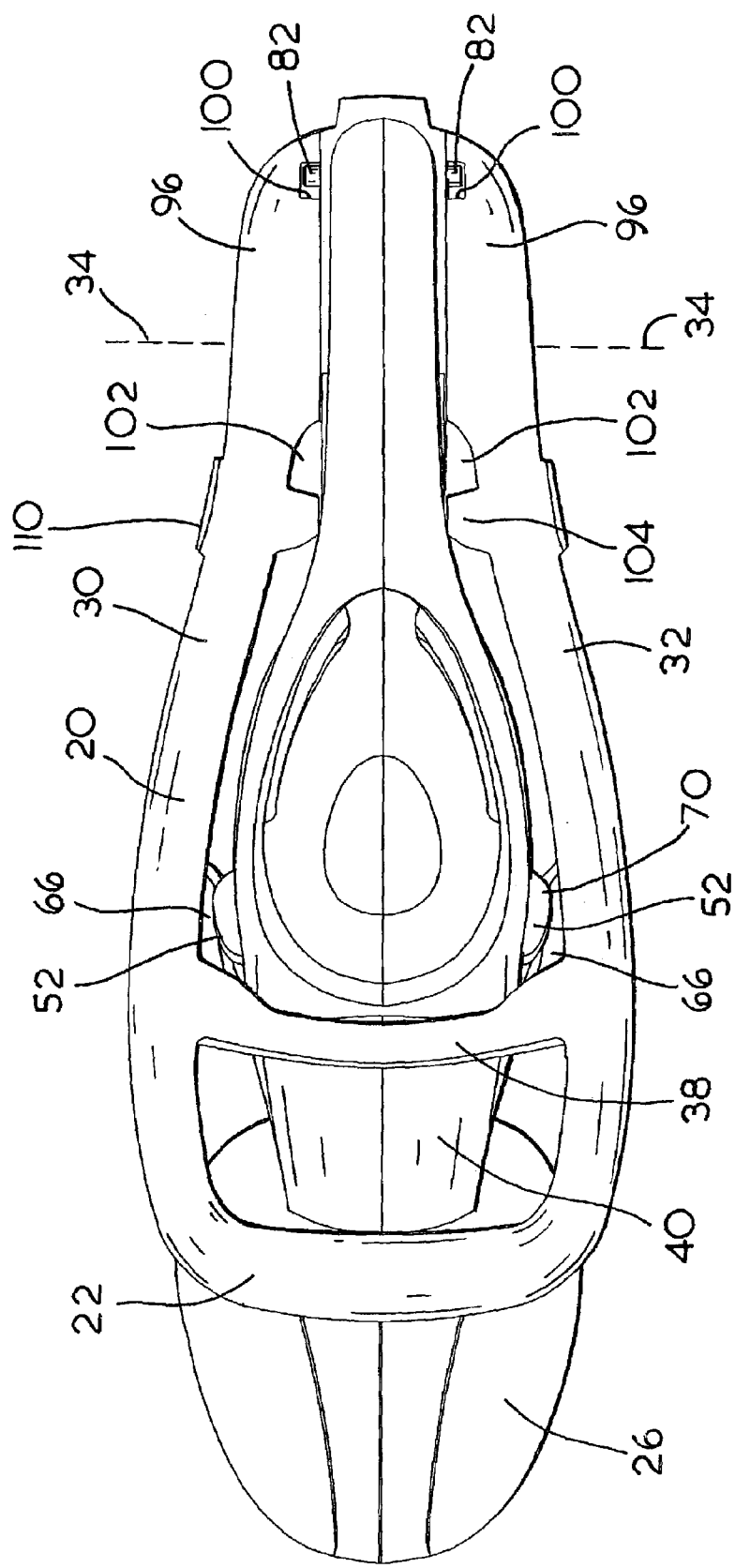
FIG. 4 is a plan view from above of the hedge trimmer of FIG. 1.
Figure 5:
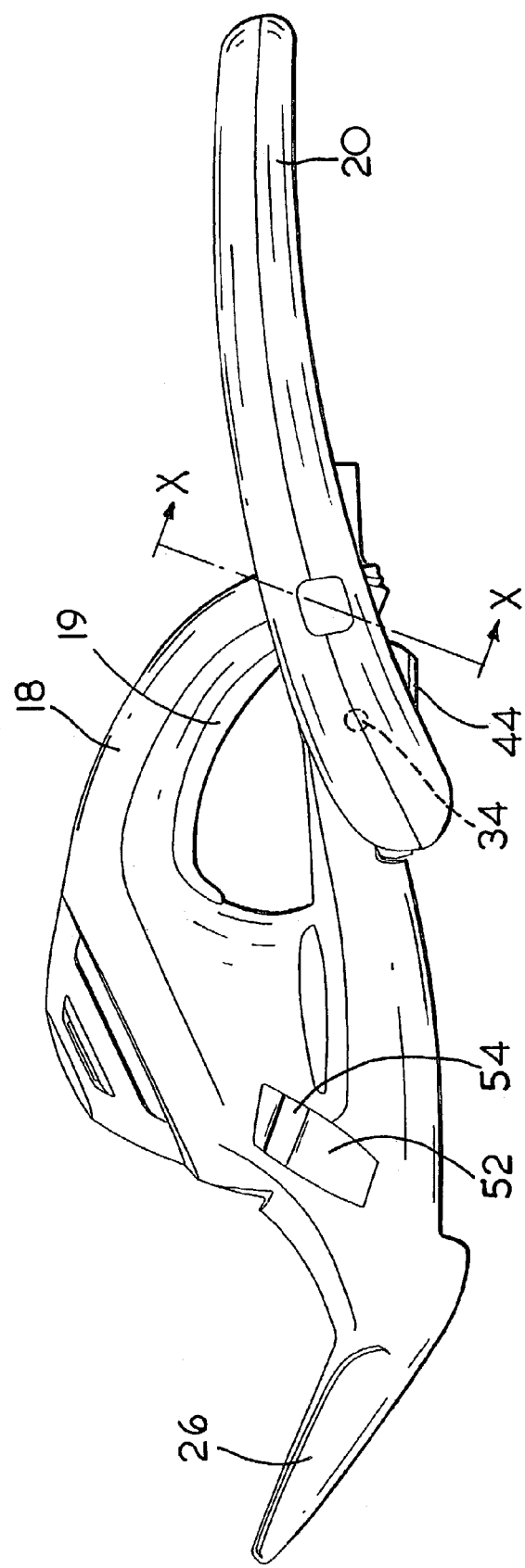
FIG. 5 is a side view of the hedge trimmer of FIG. 1 with the support handle in a second operative position.
Figure 6:
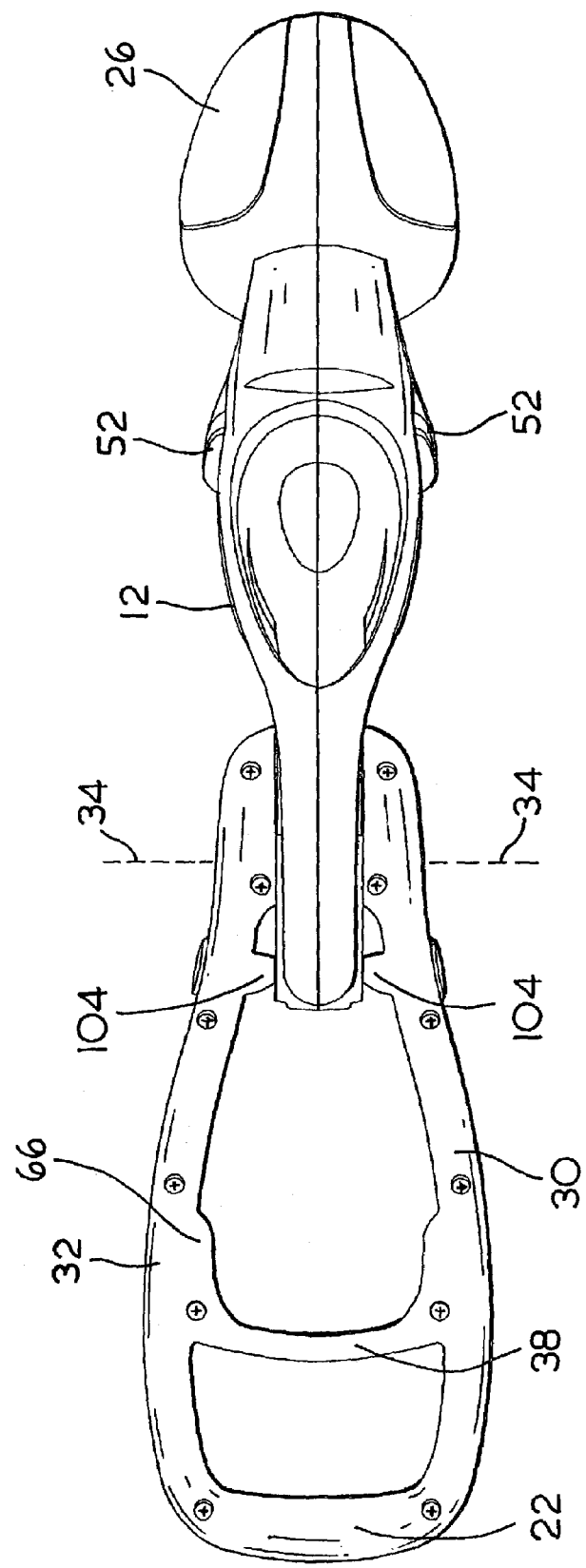
FIG. 6 is a plan view from above of the hedge trimmer of FIG. 5 with the handle in the second operative position.
Figure 7:
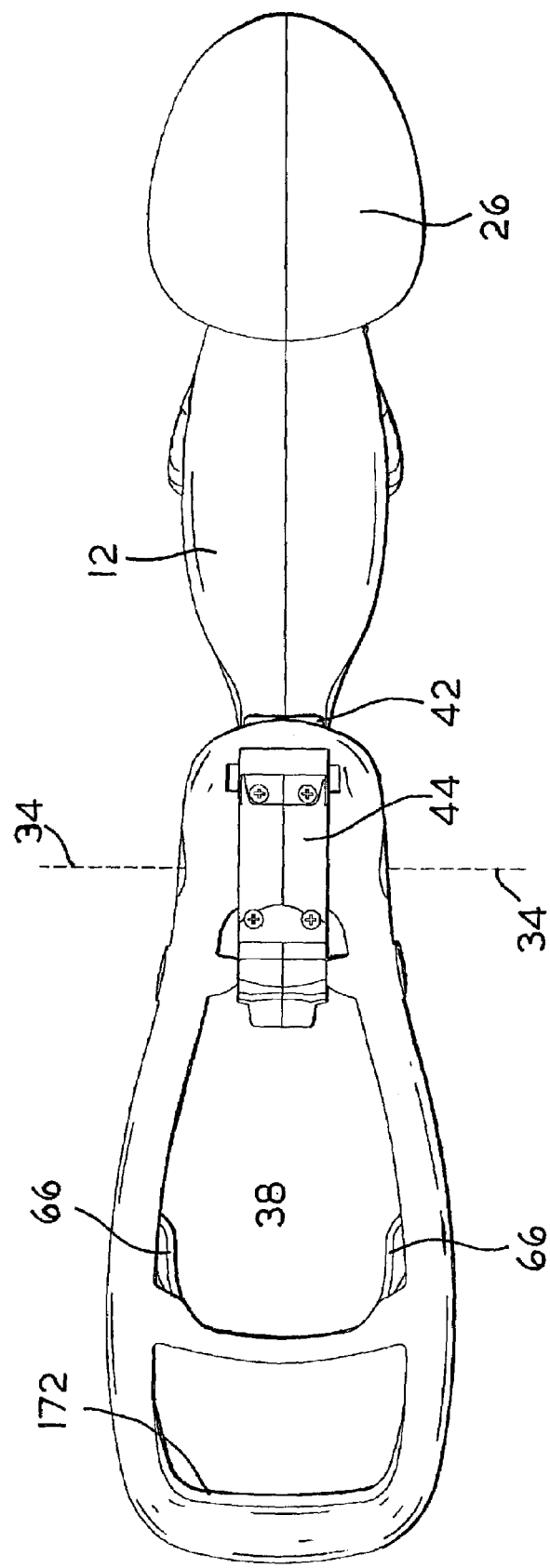
FIG. 7 is a plan view from below of the hedge trimmer of FIG. 5 with the support handle in the second operative position.

Whilst it is conventional for hedge trimmers of this type to have a secondary support handle extending or disposed towards a front end (28) of the hedge trimmer (10) so as to lie substantially in the position shown in FIG. 1 and FIG. 2, (whereby this handle (20) is disposed so that its grip portion (22) is in front of, or forwards of, the D shaped handle (18)) the current invention differentiates over the prior art devices of this type in that this secondary support handle (20) is pivotally mounted on the main body (12) so that it can be displaced from its forwardly extending position shown in FIGS. 1 to 4 to a secondary, rearwardly disposed position on the tool (10), as shown in FIGS. 5 to 7.

In the current embodiment, the support handle (20) is substantially U shaped, as best seen in FIG. 4, having two elongate arm members (30, 32) extending from the grip portion (22), which grip portion forming the base of such a u shaped configuration. The support handle (20) is pivotally mounted about a pivot axis (34) disposed towards the rear (36) of the housing of the main body (12). Whilst not shown in the accompanying figures pivotal engagement will be effected by two inwardly directed projections extending from each of the two arms (30, 32) of the support handle (20) which projections being received in a complimentary fit within two recesses disposed either side of the body (12) in a conventional manner to allow rotation of the handle about these two aligned projections. However, the exact form of the pivotal engagement between the handle (20) and the body (12) could take many forms inclusive of projections extending from the body for receipt in complimentary recesses formed in the two arms (30, 32). The important feature is, is that the handle (20) is restrained in pivotal engagement with the body (12) about this pivot axis.

The U shaped handle (20) is further provided with a cross bar (38) (as best seen in FIG. 4) which cross bar is provided so as to present a first end stop position of this pivotal handle relative to the body (12) by engagement with an external front face (40) of the main body (12), which engagement defines an end stop position of the handle (20) in its position shown substantially in FIGS. 1 through 4. Here, such engagement between the cross bar (38) and the front face (40) prevents continued pivotal displacement of the handle in a forward direction, thereby defining an end stop position. In addition, whilst the cross bar (38) is shown integrally moulded with the arm members (30, 32) so as to be fixed relative thereto, it is also possible that this cross bar (38) could be slideable mounted along the arms of this U shaped support handle (20) to be adjustably secured at a plurality of different positions along such arms, thereby providing opportunity for selectively adjusting the end stop position of the support handle (20) on the main body (12). This would allow each operator to tailor the support handle position to their particular comfort requirements, when the handle is forwardly disposed.

This U shaped support handle (20) is further provided with a second cross bar member (42) (FIG. 3) which extends between and is mounted on the opposed arms (30, 32) towards their respective free ends remote from the grip portion (22). Similar to operation of the first cross bar member (38), the cross bar member (42) provides a second end stop member which can be brought into engagement with the lower surface (44) of the body (12), as shown substantially in FIG. 7, as the handle is rotated to its second operative position as shown in FIGS. 5 through 7. Here, the U shaped handle (20) is pivoted about the axis (34) so that the cross bar (42) (which is initially disposed adjacent to a first part of the underside surface (40) of the main body (12)) is then displaced about the pivot axis (34) (see arrow (46) of FIG. 2) until it engages with an alternative portion (37) of the lower surface (44), thereby defining a second end stop position of the handle (20) as shown in FIGS. 4 through 7, when the support handle is displaced so as to extend rearwardly of the D shaped handle (18). This cross bar member (42) also serves to define a pivotal limitation of the U shaped handle in either of the front or rearwardly disposed positions, due to its co-operation with this underside surface (44) at the aforementioned two different positions (ie. the cross bar (42) can also engage with the lower surface of the body (12) when in its first operative position shown in FIG. 3, if so required, to either provide an additional or a sole end stop member, and thus providing an option of removing the requirement of the first cross bar member (38)). However, cross bar member (38) is preferred in the current invention to alleviate the possibility of creating undue stress on cross bar member (42) if used to support the handle in position shown in FIGS. 1 through 4 (due to the large leverage which would be placed thereon).

Additionally, as with cross bar member (38), cross bar member (42) could also be longitudinally adjustable along the U shaped handle (20) so as to vary the end stop position if required to provide a tool with a plurality of rearward handle positions.

This hedge trimmer (10) is further provided with restraining means which are engageable between the support handle (20) and the body (12) so as to restrain the support handle when in either a predetermined forward position (FIG. 1) or in an alternative rearward position (FIG. 4). In the preferred embodiment described herein, this restraining means comprises two distinct restraint means or locking mechanisms, one each for restraining the pivotal support handle (20) in either its first, forwardly disposed position (FIG. 2) or rearwardly disposed position (FIGS. 5 through 7) (i.e. in front of or behind the D-shaped handle (18)). Each of these two restraint means have a first engagement member on the handle for engagement with a second engagement means on the body to secure the handle (20) to the body as will now be described in more detail.

The hedge trimmer (10) has a first engagement mechanism or restrain means (50) mounted between the body (12), forward of the D shaped handle (18), for engagement with associated means on the support handle (20) when said support handle is in its first forward operative position shown in FIGS. 1–4.

Figure 8:
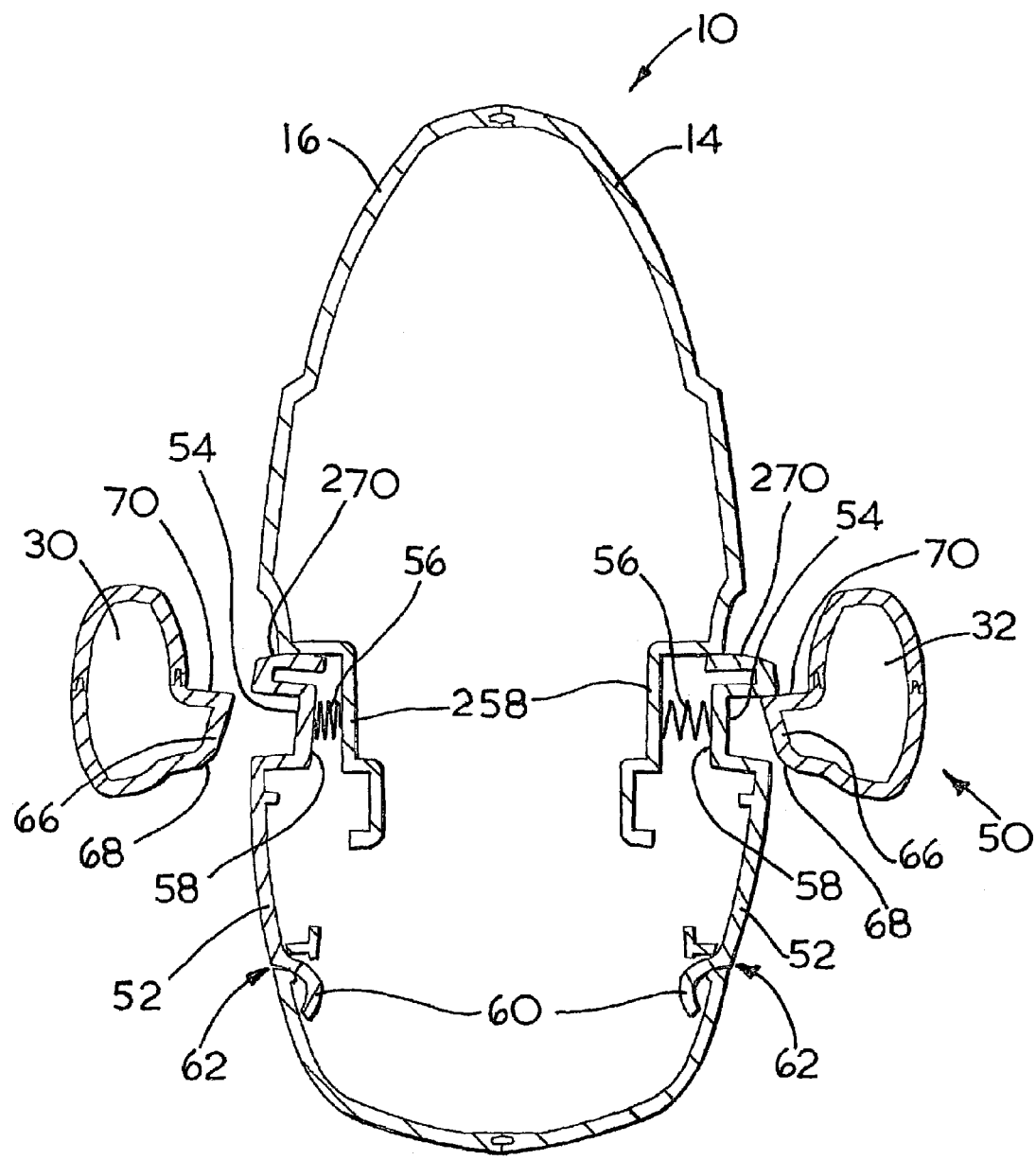
FIG. 8 is a schematic cross sectional view showing the relationship between the support handle and the main body of the hedge trimmer of FIG. 2 along the lines VIII—VIII.

This first engagement mechanism (50) comprises two resiliently deflectable members (52) one each symmetrically disposed on either side of the body (12), as best seen in FIG. 8 (showing a cross sectional view of the hedgetrimmer (10) along the lines VIII—VIII in FIG. 2) which, for clarity, is shown with all internal workings of the tool omitted. Each of the deflectable members (52) substantially comprise a button having a rectangular rebate (54) formed therein and which is resiliently biased to an outwardly disposed position (relative to the tool body) by an associated spring member (56) disposed between an inner surface (58) of the channel (54) and an inner rib (258) integrally formed with the associated clamshell half (14 or 16). Furthermore, each of the resiliently deflectable members (52) is also pivotally mounted to the associated clamshell (14, 16), as best seen in FIG. 8, wherein a lower edge portion (60) of each member (52) forms a curved tail end which is received within an aperture or slot (62) in the clamshell, so as to be retained therein in a manner which allows the opposed, top end (inclusive of the channel (54)) to be pivotally biased about this engaged tail (60), inwardly of the body (12) and against the spring member (56), which spring member thereby serves to counterbalance the resilient pivotal force so as to maintain this deflectable member to their outermost positions as shown on the right hand side of the body of the hedge trimmer of FIG. 8.

Referring now to FIGS. 4 and 8, the arm members (30, 32) each have inwardly directed projections or flange members (66) at a position thereon which is aligned with the deflectable members (52) when the handle is in the forward position as shown in FIG. 4. Each of the arm members (30, 32) have substantially oval shaped cross sectional areas (FIG. 8) from which theses inwardly directed flange members (66) extend towards one another (also refer to FIG. 4 and FIG. 7). These flange members (66) are provided with a lower, inclined lead-in cam surface (68) and an upper shoulder member (70) which extends substantially transversely from each of the arms (30, 32) to the outer extreme of the flange member (66).

In operation, as the support handle (20) is moved from a non-engaged position towards the position shown in FIG. 1, the lead-in cam surfaces (68) of each of the arm members are brought into engagement with a top surface (270) of the adjacent deflectable member (52) (opposed to the tail end (60)) and, as the cam surface (68) is continued to be displaced downwardly as viewed in FIG. 8 it exerts an inwardly directed deflection force on the member (52) (since the arm members (30, 32) are restrained from relative displacement away from one another by the cross bar (38), they are thus restrained from displacement away from the body (12) by any reaction force). Such a deflecting force causes each deflectable member (52) to be displaced against the biasing of the spring member (56) and to pivot about its tail portion (60) until such time that the shoulder portion (70) of the flange member (66) engages with the rectangular channel (54), at which time the channel (54) snap engages with the flange member (66) under the biasing of spring (56), as shown substantially on the right hand side of the hedge trimmer (10) as shown in FIG. 8. Engagement of the shoulder (70) with the rectangular channel (54) thereby restrains the handle from upward displacement relative to the body (10) when viewed in FIG. 8. Further continued downward displacement of the handle is subsequently restrained by co-operation of the cross bar (38) with the main body (12) as previously described.

In practice, both arms (30, 32) will be engaged and restrained by their associated deflectable members (52) which effectively form resilient catches for engagement with the handle arms (30, 32). It will also be appreciated that whilst the flanges (66) have been provided in this embodiment with cam lead-in faces (68), the deflectable member (52) alternatively, or additionally, could be provided, on their upper surface (270) with an appropriate cam lead-in face for effecting complimentary cam displacement of the member (52) when engaged by the flange member (66).

In addition, the spring members (56) could be omitted if sufficient resilience is achieved within the deflectable members (52) themselves to be resiliently biased to there operational outermost position shown in FIG. 8 right hand side.

It will be appreciated, for clarity of explanation, that FIG. 8 shows only one arm member (32) in restrained engagement with this first engagement mechanism (50).

Referring now to the left hand side of the hedge trimmer (10) shown in FIG. 8, the mechanism for deactivating this first locking mechanism is illustrated. As can be seen from FIG. 2, when the support handle (20) is in the forwardly engaged position, a large surface area of the deflectable member (52) remains exposed for engagement and accusation by the user. The user is then able to depress this exposed deflectable member (52) against the biasing of the spring member (56) to the position shown on the left hand side of the hedge trimmer (10) of FIG. 8, thereby displacing the channel (54) out of engagement with the flange member (66) and associated shoulder (70), allowing the handle (20) to be pivoted away from the engaged position shown in FIG. 1 and away from this first engagement mechanism. Where the handle is engaged on both sides of the body (as in the present example) both deflectable members (52) must be actuated simultaneously to allow the support handle to be moved.

In this preferred embodiment, the exact positioning of the first engagement mechanism (50) is positioned so as to substantially coincide with the centre of gravity G (FIG. 2) of the hedge trimmer (10). Specifically, due to the positioning of the motor in the front bulbous housing of the trimmer (10) and the positioning of the reciprocating blade (24), the centre of gravity of this particular tool is disposed towards to front end of the clamshell as shown. In addition, and as seen in FIG. 3, the positioning of the two members (52) either side of the clamshell are such than an operator is able to place their hand on the underside of the tool body such that a thumb and forefinger can then be used to depress both deflectable members (52) simultaneously so as to release the support handle (20). A significant benefit of the positioning of these engagement mechanisms (50) so as to be coincident with the centre of gravity is that when the support handle (20) is released from engagement with the first engagement mechanism (50), the operators' hand is supporting the tool body substantially under its centre of gravity thereby effecting stability and support of the tool body as the handle position is adjusted. Secondly, by positioning the two deflectable members on either side of the clamshell ensures that the users' hand must be firmly in engagement and gripping the clamshell so as to extend to activate both members (52) simultaneously. In this manner, the specific design ensures that the handle adjustment can be achieved safely by ensuring the user correctly holds and supports the power tool. In this way, once the handle (20) is released from the tool body, the tool body does not suddenly pivot about an alternative unsupported centre of gravity thus allowing the tool to be adequately supported by one hand as the operators' other hand is then used to pivot the handle (20) as will now be described.

In practice, it will be appreciated that the support handle is simply pivotally displaced towards this first engagement mechanism (50) for snap engagement therewith to restrain it in a first restrained position such that the grip member (22) of the handle (20) is disposed in front of (or forwards of) the main D shaped handle (18).

The second engagement mechanism or restraint means (80) again basically comprises two resiliently biased projection members (82) both disposed so as to project transversely and symmetrically from either side of the main body (12) at a position disposed towards the rear (36) of the body (12), so as to co-operate with each of the arm members (30, 32) of the handle (20) when positioned in a rearwardly extended position as shown in FIGS. 5 through 7. As such, these second restraint means are disposed rearwardly or the other side of the support handle pivot axis (34) (FIG. 2) as compared to the first restraint means (50).

Figure 9:
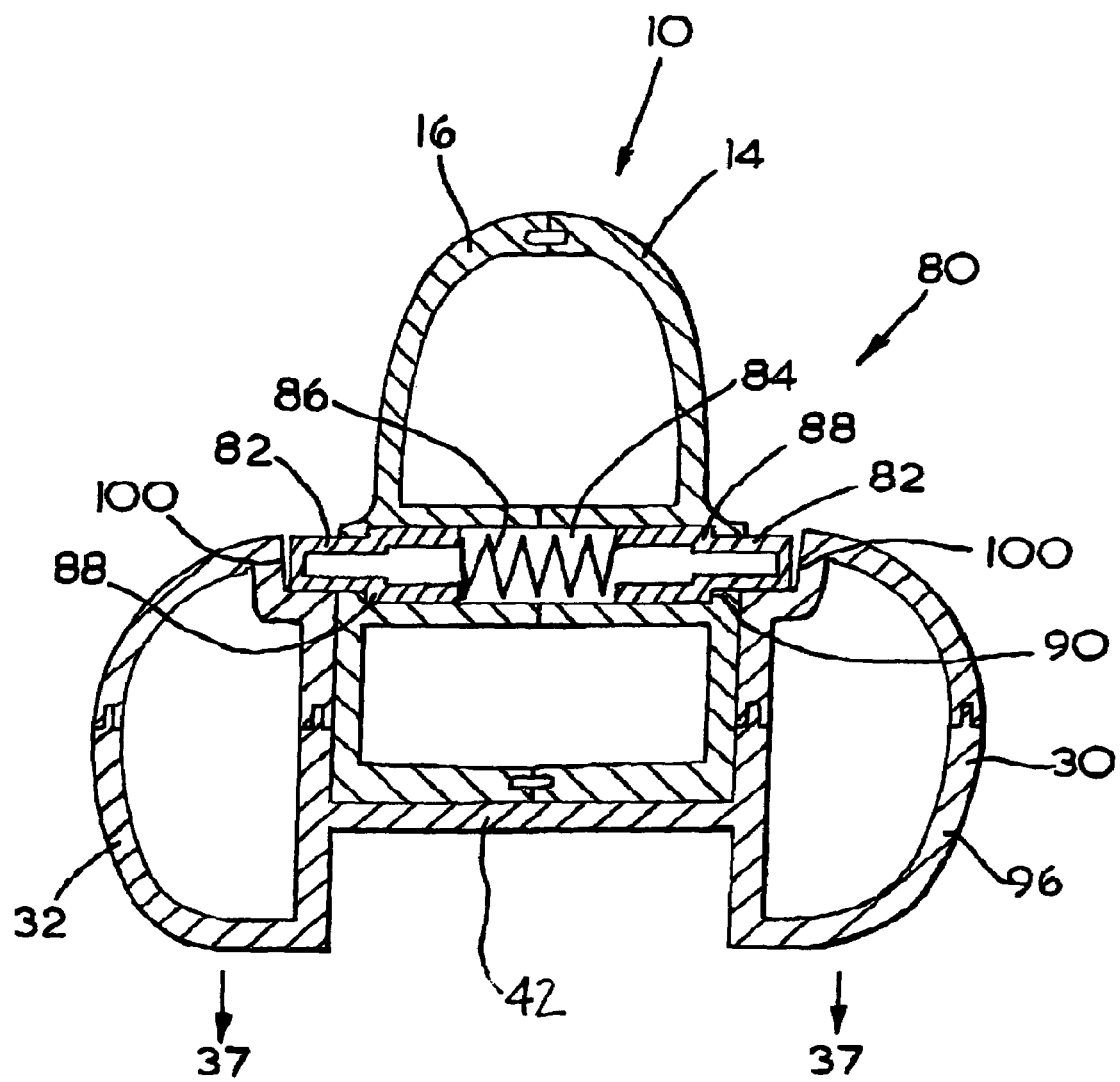
FIG. 9 is a schematic cross sectional view along the lines IX—IX showing the relationship between the support handle and the main body of the hedge trimmer along the lines IX—IX of FIG. 2.

Firstly referring to FIG. 9, showing a cross sectional view of the rear portion of the hedge trimmer (10) (along the lines IX—IX of FIG. 2) it can be seen that the second engagement mechanism (80) comprises a substantially tubular recess (84) which passes through the width of the rear of the body (12) and, mounted within this tubular recess (84), are two projections (82) which are biased away from each other by an internal spring member (86) disposed therebetween. This spring member (86) urges these two projections (82) outwardly of their associated clamshells (14, 16). Each of the projections (82) are provided with a circumferential stepped portion (88) representing a sudden change in projection diameter, thereby forming a shoulder (90) disposed between two portions of each projection defined by these different diameters. In this manner, each of the projections (82) has an elongate inner portion having a first diameter and an elongate outer portion having a second diameter less than the first diameter. Each of the opposed apertures of the tubular recess (84) has a diameter substantially equal to that of the second smaller diameter of each projection (82), which is thus able to pass therethrough but which aperture is smaller than the first diameter thereby effecting abutment between the shoulder (90) and the clamshell defining such apertures, as shown substantially in FIG. 9. Such engagement thereby defines the maximum extent to which each of the projection members (82) are able to project externally of the body (12) in a rest position biased by the spring member (84).

As shown in FIG. 2, when the handle (20) is in the first forward position the two remote ends (96) of each of the arms (30, 32) partially overlie these projections (82) and are thus provided with appropriate inwardly directed recesses (100) so as to receive the projections (82) when the handle (20) when in this first forward position.

As can also be seen from FIG. 9, the second cross bar (42) herein engages with a lower surface of the rear (36) of the main body (12) to provide an additional end stop position of the handle position (20) in the first forward position.

When the handle (20) is subsequently rotated about its axis (34) from the first forward position (FIGS. 1 to 4) to the rearward second position (FIGS. 5 to 7) the arm members (30, 32) are displaced downwardly and away from the body portion (12) in the region of the second engagement mechanism (80). This is shown generally by arrows (37) in FIGS. 2 and 9.

Figure 10:
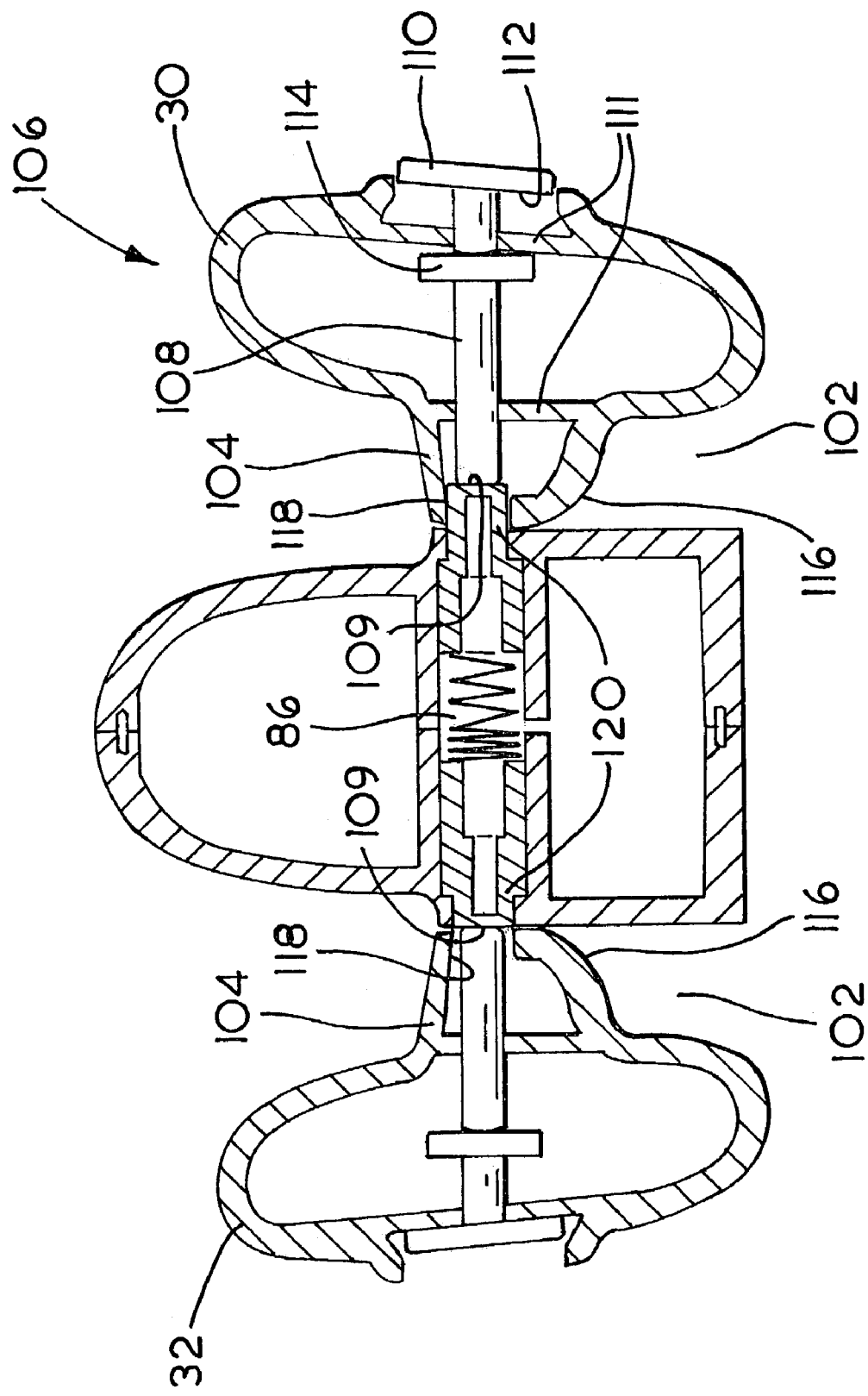
FIG. 10 is a schematic sectional view showing the relationship between the support handle and the main body of the hedge trimmer along the lines X—X of FIG. 5.

As seen in FIG. 4, the distance between the two arm members (30, 32) is substantially uniform towards their remote free ends (96) so as to lie substantially adjacent and parallel to the rear portion of the body (12). However, this distance begins to increase towards the grip portion (22), whereby the arms (30,32) diverge to reflect the increase in body width, but also to effectively form a channel (102) between the arms (30, 32) and the adjacent body (12) of the hedge trimmer (10). Each arm (30, 32) is also provided with a second inwardly directed symmetrical flange member (104) which, when the handle is disposed in the second rearward position, are aligned with the second engagement mechanism (80). This is best seen in FIG. 6 and FIG. 10 (FIG. 10 showing a cross sectional view of the second engagement mechanism and the main body (12) when the handle is in its second position and the second engagement mechanism has engaged with the handle (20)). Each of these second flange members (104) form part of a second engagement means (106) on the arms (30, 32) for co-operating engagement with the second engagement mechanism (80) when the handle is in the second rearward position.

This second engagement mechanism basically comprises a slideably displaceable rod member (108) mounted to extend transversely through the arm (30) and its associated flange (104). This rod (108) extends through a plurality of inner support walls (111) each having a defined aperture substantially corresponding in diameter to that of the rod (108). Mounted on the rod (108) at an outwardly disposed end thereof, so as to project beyond the outermost support wall (111), is a button (110). The button (110) has a larger diameter than the rod (108), thereby presenting a shoulder (112) extending from the rod (108). Disposed partway along the length of the rod (108), away from this button (110), is a second stop member, in the form of a circular plate, (114) disposed inwardly of the outermost support wall (111) as shown in FIG. 10. In this manner, the rod (108) is free to be slideably and transversely displaced within the arm (30) by a distance defined as that between button (110) and stop member (114) which in the two extreme displaced conditions will alternatively abut and engage the outermost support wall (111). The stop (114) also serves to prevent the rod (108) being completely removed from the arm (30).

Arm member (32) is provided with a similar second engagement mechanism to that of arm (30). In the cross sectional view shown in FIG. 10, rod member (108) mounted in arm member (30) is shown with the stop member (114) in engagement with the outer wall (111) showing one extreme displaced limit of this rod, whereby arm member (32) is shown with rod member (108) in the second opposed displaced position whereby button (112) defines the limit of displacement of the rod within arm member (32). In the position shown for arm member (32), it will be appreciated that the button (112), by engagement with the wall (111) prevents an inwardly directed end (109) of the rod member (108) from projecting externally of flange member (104), but sits flush with the outer surface of the flange member. In this manner, rod member (108) is unable to engage with an outer surface of any part of the body clamshell (12).

Additionally, each of the flange members (104) are provided with an inclined lead-in cam surface (116) and the inwardly directed ends of the flange members (104) are each provided with openings (118) having a diameter sufficient to permit the externally projecting portion of the projecting member (82) to be received therein as shown in FIG. 10 (for arm member (30)).

In this manner, as the support handle (20) is pivotally displaced towards its second, rearward position (as shown in FIG. 5) each of the lead-in cam surfaces (116) of the flange members (104) are brought into abutment with the externally biased projecting sections (120) of each projection member (82). The inclined nature of these cam surfaces (116) then exert a transverse force to the biased projection members (82) whereby continued downward displacement of each of the arms (30, 32) thereby effect inward displacement of the projections (82) against the biasing of the spring member (86), which is subsequently compressed. Continued displacement with the arm members (30, 32) will then bring the external portion (120) of the projection member (82) into alignment with the opening (118) in each associated flange member (104) allowing this projection (120) to snap engage with the opening (118) under the resiliently biasing force of the compressed spring (86).

Engagement between each projection member (82) and this opening (118) in the handle (30) thereby locks the handle (30) in the position shown substantially in FIG. 10. Receipt of the projection members (82) into the opening (118) also causes engagement with the rod member (108) disposed therein, displacing the rod member outwardly of its associated arm (30) until the end stop (114) is brought into engagement with the outer support wall (111), thus disposing the button (110) to its outermost position (as shown in relation to arm member (30) in FIG. 10). Again, alignment of this second engagement means (106) with the associated restraint means (80) on the body is assisted by appropriate engagement of the second stop member (38) with the underside of the body, such engagement serving to effect the required alignment (as previously described).

To release this second engagement mechanism a user must then manually depress the button (110) to the position shown in relation to arm member (32) in FIG. 10, effectively displacing its engaged projecting member (82), against the resilient biasing force of the spring (86), until such projection member (82) is forced back out of the opening (118) in the flange. Engagement of the button (110) with the outermost wall member (111) prevents the rod (108) from being disposed into the recess (82) in the body (12). In this manner, as shown in FIG. 10, both the rod member (108) and the projecting member are positioned so as to lie flush with the flange member (104) and body clamshell respectively, whereby the arm member (32) can then be pivotally displaced away from the second engagement mechanism in a conventional manner. Again, in this preferred embodiment, both arms must be released simultaneously to allow this pivotal displacement. When this second engagement mechanism is released, the handle (20) can be pivoted upwardly and forward with respect to and over the D shaped handle (18).

In the manner described above, the support handle (20) can be securely positioned in two substantially different configurations in relation to the tool body (12). In the first orientation the support handle (20) is disposed forwardly of the main D shaped handle (18) so as to provide a conventional hedge trimmer, whereby the grip portion (22) of the support handle (20) is disposed in a conventional position for hedge trimmers, allowing the user to obtain greater support and control of the hedge trimmer in a usual operational manner. However, when the first engagement means is then released, the handle (20) is able to be pivoted to the second rearwardly disposed position whereby the grip portion is disposed rearwardly and remote from the main D shaped handle (18) in a position shown substantially in FIGS. 5 through 7. In this position, the user can operate the hedge trimmer in a manner extended away from his body, such as when necessary for the user to stretch to reach areas which are difficult to reach. In this position, the user will grip the support handle with one hand and the D shaped handle (18) with the other thereby maintaining stability and control of the tool even when the user is stretching it forward to reach previously inaccessible areas to be engaged by the cutting element of such a hedge trimmer. This provides for a more comfortable operating configuration of the power tool and allows the user to maintain greater stability when reaching forwards or upwards with such tools and especially for hedge trimmers requiring two-handed operation.

Furthermore, as is conventional for power tools and in particular cutting tools, the hedge trimmer 10 is further provided with a two handed or dual switching mechanism. Conventional dual switching mechanisms are employed to ensure that the user is correctly gripping the power tool where two handle members are provided, by mounting an associated switch with both of the gripping handles, each of which switches must be activated in order to actuate the tool itself. This provides a safety feature alleviating misuse of the tool (i.e. by one handed use) where two-handed use is recommended for safety of use.

Figure 11:
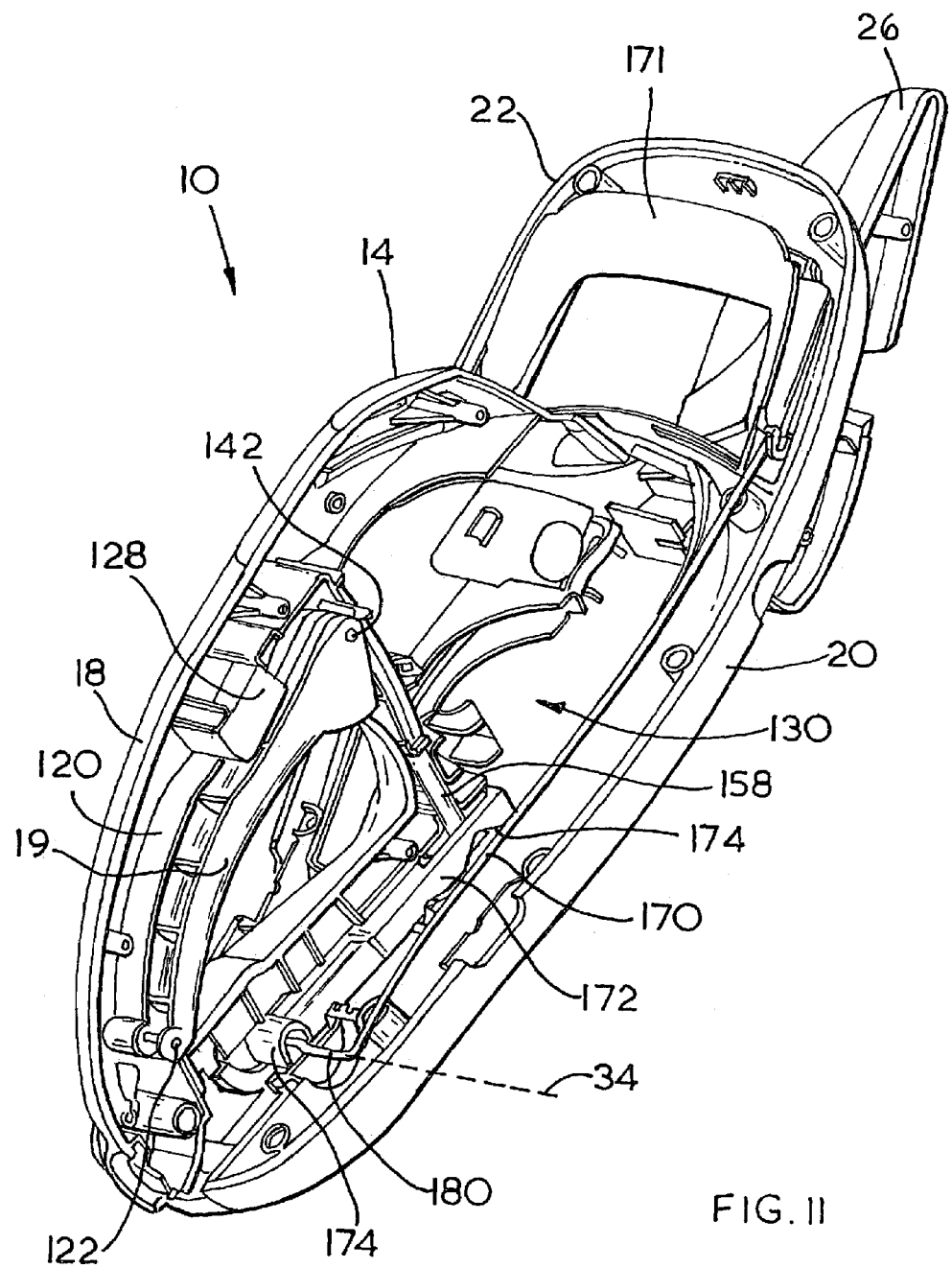
FIG. 11 is a perspective view of the hedge trimmer of FIG. 1 with the support handle in a first operative position and with part clamshell removed.
Figure 12:
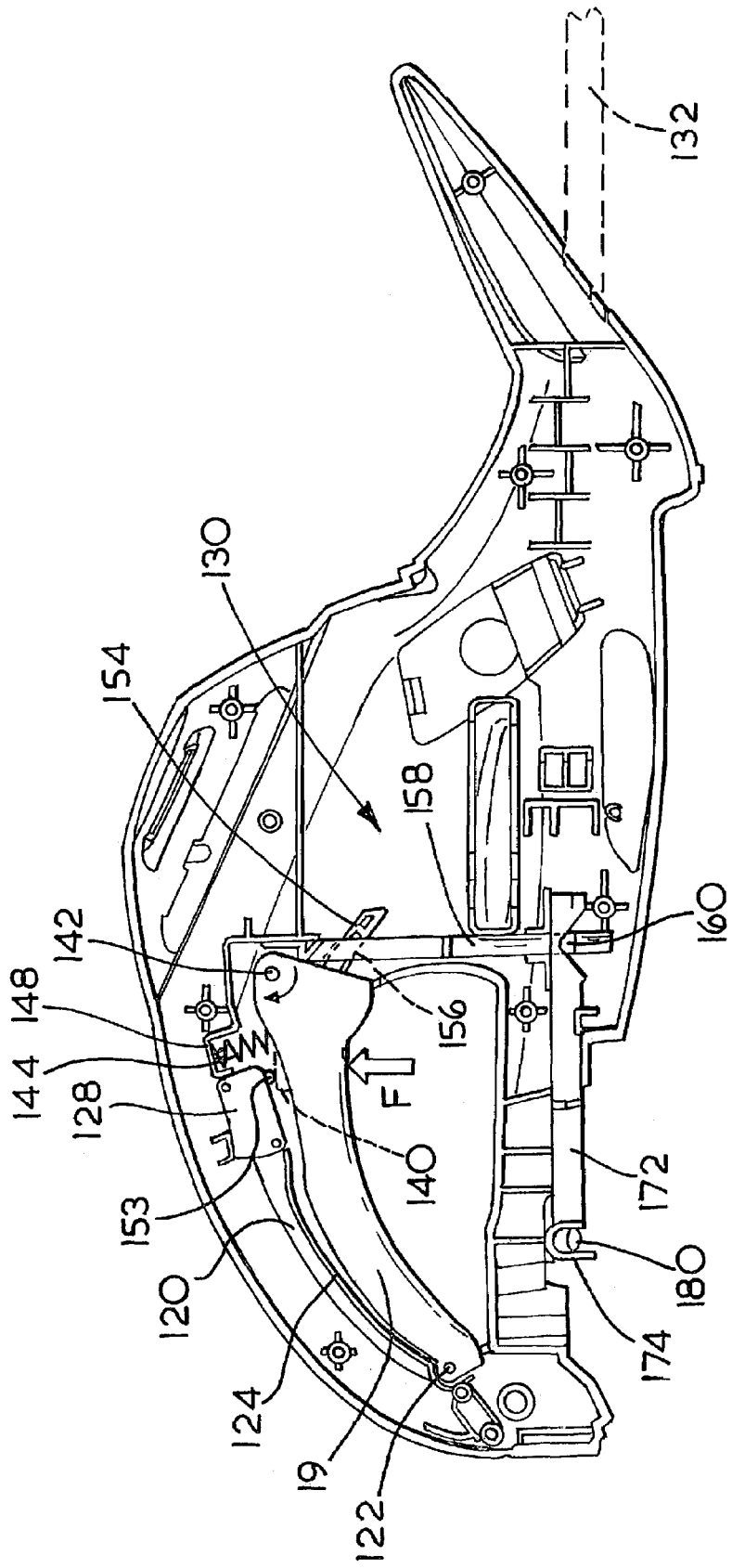
FIG. 12 is a side view of the hedge trimmer of FIG. 1 with part clamshell and support handle removed.

The present invention comprises a conventional pivotally mounted trigger switch (19) positioned on its D shaped handle (18). As shown in FIG. 11 (showing the interior of the tool 12) the inner surface of the D shaped handle (18) has a recessed section (120) accommodating the trigger switch (19) which is of a curved, complimentary shape so as to allow this trigger switch (19) to be displaced into and out of this recessed portion (120) (FIG. 11 and FIG. 12). This switch (19) is pivotally mounted about its rear end on a pin member (122) disposed towards the rear of the hedge trimmer (10). Spring member (144) (FIG. 12) is mounted between this trigger (19) and an interior wall of the clam shell (18) so as to exert a resilient biasing force on this switch (19) in order to bias the trigger (19) to its unactuated position shown substantially in FIG. 12.

Associated with the trigger switch (19) is a conventional electrical switch (128) which switch provides an electrical connection between the power source (whether it be battery or mains electric) and the motor. In the current embodiment, both the power source, the electrical connections and the motor are omitted for clarity, but are considered standard within the field of power tools and need not be described in any great detail here. The motor will be housed within the tool body (12) in the region shown substantially as (130) in FIGS. 11 and 12, having its rotary output connected to a conventional rotary to linear drive conversion mechanism and appropriate gearing mechanism to provide a substantially reciprocating linear output to which a blade member (shown schematically as (132) in FIG. 12) will be attached.

This electrical switch has a button actuator (153) which must be displaced inwardly by engagement of the trigger (19) (or part thereof) in order to complete an electrical connection between the power source and motor.

An upper, rigid stop member (124) is supported on the body (12) within the recess portion (120) to define an upper stop, thereby limiting the range of pivotal displacement of the trigger (19). When the trigger (19) is actuated by application of a force F in the direction shown by the arrow in FIG. 12, the trigger switch is pivotally displaced until it abuts end stop (124), defining the pivotal limitation of the trigger (19). This pivotal limitation, in the current embodiment, is insufficient to allow the trigger body itself to engage the button switch (153).

Referring now to FIG. 13 and FIG. 13a, the trigger (19) is substantially hollow and comprises a pivotally mounted L shaped lever (140) disposed towards the front end of thereof, pivotally mounted about a pivot pin (142) extending transversely through the trigger (19). This L shaped lever is shown in hashed lines in FIG. 13 and schematically illustrated in FIG. 13a representative of the general shape and pivot point of such a lever.

A spring member (144) is disposed between a first branch (146) of the lever (140) and an internal rib (148) of the clam shell, to exert a biasing force on the L shaped lever so as to effect pivotal biasing of the lever (140) in an anti-clockwise direction about the pivot axis (142), when viewed in FIG. 11, thereby biasing the first branch (146) into the trigger (19) and biasing the second, opposed branch (154) outwardly of this trigger. In this manner, a switch actuator branch (150) of the L shaped member is biased, about the pivot axis (142), into the hollow trigger handle (19) so that it does not project externally therefrom.

However, if this L-shaped member (140) is displaced against the spring biasing force in a clockwise direction (FIG. 13) then the switch actuator branch (150) thereof will project out of the trigger (19) which will then be capable of engaging and depressing the button switch (153) of the electrical switch (128) at or before the pivotal displacement of the trigger (19) (when actuated) is limited by the stop member (124).

Therefore, actuation of the trigger switch alone is insufficient to operate the hedge trimmer (10).

The opposed elongate branch (154) of the lever (140) projects beyond the front end of the trigger (19) so as to be received within an aperture (156) formed in a slideably displaceable elongate bar (158) which is restrained by appropriate clam shell ribs (not shown) so as to move in a substantially vertical direction, whilst restrained from any lateral displacement. The aperture (156) is elongate allowing the branch (154) to be displaced along and within this aperture (156) when the sliding bar (158) is in its unactuated position shown substantially in FIG. 12, whereby actuation of the trigger (19) and the resultant pivotal displacement simply causes the branch (154) of the lever (140) to freely move within the aperture (156) as when viewed in FIG. 12, so that no force will be encountered on this branch (154) by engagement with the bar (158). The limited displacement of the trigger 19 defined by engagement with the stop member (120) corresponds to the elongate length of the slot (156) before the branch (154) abuts a top edge (157) thereof. The sliding bar 158 is resiliently biased by spring member (not shown) into this unactuated position.

Furthermore, one end of vertically sliding bar (158), remote from trigger (19), comprises a cam member (160) having two opposed inclined cam surfaces (162, 164) defining a substantially A shaped cam follower member (FIG. 13). This cam follower member (160) is received within a substantially inverted V-shaped cam surface (169) within a horizontally sliding bar member (172). In its unactuated position, the vertical sliding arm (158) is biased into its upper position as previously described, so that the cam follower member (160) engages and biases the V-shaped cam surface into cam alignment with the apex of the A-shaped cam follower member (160) as show in FIG. 12.

Movement of the horizontal sliding bar (172) from left to right or right to left when viewed in FIG. 13 will in effect cam engagement between one of the cam surfaces (162 or 164) of the cam follower member (160) with one of the inclined side faces of the cam surface (169) effectively causing the cam follower member to slide down one of the sides of the V-shaped surface (169) causing subsequent downward displacement of the vertically sliding bar (158), against its resilient biasing force, to a position shown in FIG. 13 (although the horizontal sliding bar (172) has not been shown displaced for clarity). In this manner, the upper edge (157) of the elongate slot (156) has been brought into engagement with the branch (154) of the lever (140), before displacement of the trigger (19). Subsequent pivotal displacement of the trigger (19) then results in continued engagement of the branch (154) with the top edge (157) and the slot (156) thereby effecting pivotal displacement of the lever (140) about the pivot axis (142), against the resilient biasing of spring (144), causing the switch actuator branch (150) of the lever (140) to be pivotally displaced clockwise about its pivot axis (142) so as to extend outwardly of the trigger (19), as shown in FIG. 13 and illustrated by the dotted lines in FIG. 12. In this manner, since the arm (150) projects externally of the trigger (19), continued pivotal displacement of the trigger (19) will then bring this displaced branch (140) into engagement with the button switch (128) to effect actuation of this electrical switch to provide power to the motor in a conventional manner.

It will be appreciated that displacement of the bar (172) in either direction transverse to the vertically displaceable bar (158) will result in similar displacement of the bar (158) to allow the trigger switch (19) to actuate the electrical switch (128), due to the symmetrical inclined relationship of the associated cam surfaces.

In an alternative embodiment of this invention, the elongate aperture (156) of the vertical bar (158) may be replaced simply with an aperture of comparable cross section to that of the branch (154) of the lever element, whereby the branch is slideable therethrough but is maintained in permanent engagement with the shoulder (157). Here, the bar (158) is not biased in any manner by is vertically slideable in response to vertical displacement of the branch (154), the spring member exerting a sufficiently large force to bear the weight of this bar (158) as the trigger (19) is displaced and displacement of the bar (158) is effected by engagement with the branch (154). Here, the bar (158), its cam surface (160) and the horizontal bar (172) with V shaped cam surfaces are identical to those previously described, but here, when the trigger is unactuated, the bar (158) is disposed so that the cam member (160) is disposed so as to lie out of engagement with the cam surface (169) as shown in FIG. 13. As such, as the trigger (19) is pivotally displaced about its pivot axis (122), biasing force of the spring (144) is sufficient to maintain lever (140) in its unactuated position and a lifting force is applied to the bar (158), allowing the cam follower (160) to be freely displaced within the apex of the V-shaped cam surface (169). In this manner, if the horizontal bar (172) has not been displaced then the bar (158) does not incur any resistance to vertical displacement, and no additional biasing force is exerted on the lever (140) to effect pivotal displacement about its axis (142). However, in the event of horizontal displacement at the bar (172), either before or after the trigger switch (19) has not been actuated, then one of the opposed inclined cam surfaces will be brought into engagement with one of the cam follower surfaces (162, 164) which will restrain any subsequent vertical displacement of the bar (158) (or subsequently effect downward displacement thereof upon actuation of the trigger (19) whereby this restraint will subsequently prevent vertical displacement of the arm (154) of lever (140) as the trigger (19) is pivoted about its axis (142) and this resistance will effect relative pivotal displacement of the lever about its axis (142) so as to dispose the actuator branch (150) to project proud of the trigger (19) and thus be in a position which can engage and actuate the button switch (153) of the electric switch (128) as previously described. In the event that the trigger switch (19) has been displaced prior to displacement of the horizontal bar (172), then, as previously described, the projection (150) does not extend beyond the upper edge of the trigger switch (19) and cannot engage with the button (153). However, subsequent displacement of the horizontal bar (172) in either direction will in effect cam engagement between the cam surface (169) and one of the cam follower faces (162, 164) (which will have been lifted, on bar (158) into the V-shaped apex of the cam surface) to physically displace the vertical bar member (158) in a downwards direction and thus effect pivotal displacement of the actuator branch (150) about its axis (142) so as to be brought into engagement with the button (153) of the switch (128). It is only when both the trigger (19) has been pivotally displaced upwardly as viewed in FIG. 12 and the lever (140) has been pivotally displaced against its spring bias (144) can the trigger mechanism actuate the switch (128) in a conventional manner. Thus providing a dual switching mechanism, both of which must be maintained to complete actuation of the electrical switch (128).

The horizontal displacement of the bar (172) is effected by a secondary switching mechanism comprising an elongate switch actuator member (170) connected to a longitudinally displaceable switch member (171) which is formed in the grip portion (22) of the support handle (20). The actuator member (170) serves as a force transmitting member and effectively comprises a rigid bar (or alternatively could be a semi-rigid cable) which extends between this switch (172) and is received, at its end remote from the switch (171) within a substantially U-shaped aperture (174) integrally formed with the horizontal bar (172). This elongate actuator member (170) will be housed within the arm (30) of the substantially U-shaped support handle (20).

In an unactuated rest position, the horizontal bar (172) is disposed so that the substantially U-shaped member (174) has an elongate axis perpendicular to a direction of displacement of the bar (172) and which axis is substantially co-axial with the pivot axis (34) of the support handle (20). In this manner, a transverse engagement section (180) (or link member) of the actuator member (170) lies coaxial with the pivot axis (34) of the support handle (20) and extends from the actuator member (170) in the handle arm (30) into the body (12) so as to engage and be received within the member (174). Therefore, as the support handle (20) is pivoted about its axis (34) the actuator member (170) is also pivoted about the same axis until the support handle (20) is disposed in its forward position (FIG. 1) or its rearward position as shown in FIG. 7. Thus in either position of the support handle (20) the grip portion (22) is disposed equidistant from the pivot axis (34) and the actuator member (170) remains disposed between the switch (171) and the link member (180) and, thus the U-shaped member (174).

As shown in FIG. 13 when the support handle (20) is in its forward position, this actuator member (170) will be inclined relative to the horizontal bar (172) (due to the preferred angular inclination of the support handle relative to the body), preferably within an angular range of 0 to 45° so that when a user grasps the switch (171) on the support handle (22) and depresses this switch (171) the actuator member (170) is displaced in a direction (X) substantially as shown in FIG. 13 whereby the actuator member (170) is then able to exert an appropriate horizontal force vector along the bar (172), transmitted through displacement of the link member (180), to effect displacement thereof as previously described.

Conversely, when the support handle (20) has been disposed to its rearward position the actuator member (170') (shown in dashed lines, FIG. 13) can be displaced upon actuation of the switch (171) in the direction (Y) as shown in FIG. 13 which again will have transmit an appropriate force vector, via the link member (180) to the horizontal bar (172) to effect horizontal displacement in an opposed direction. Again, the angular inclination of the actuator member (170') relative to the horizontal bar (172) will be in the range of 0 to 40°. It will be appreciated that this angular range could be disposed either above or below the horizontal member as to be effective and that the angular range of the actuator member when disposed in a forward position as opposed to a rearward position may be of a different, relative to the horizontal bar, and still achieve the same function. However in this preferred embodiment the actuator member (170), when disposed in both the forward or rearward position, is disposed at 400 relative to the horizontal bar.

Displacement of the actuator member (170) is therefore used to effect horizontal displacement of the bar (172) to effect appropriate displacement of the vertical bar member (158) as previously described, and thus it will be appreciated that the actuator (170) and horizontal bar (172) serve as force transmitting members to effect transmittal of a force between the handle switch (171) and the trigger switch (19).

Both trigger (19) and switch (171) on both handles (18) and (20) respectively must be actuated in order to operate the power tool. This provides a conventional dual trigger safety switching mechanism which is operable irrespective of the position of the displaceable support handle (20).

An additional beneficial feature of the current invention is again seen in FIG. 13 whereby as the handle (20) is pivoted between its forward and rearward extreme positions (as previously described) then the actuator (170) is pivoted relative to the bar member (172) such that in between the two extreme positions any displacement of the actuator (170) (by operation of the switch (171) will have insufficient horizontal force vector to achieve sufficient longitudinal displacement of the bar member (172) so as to effect cam displacement as previously described. This is preferably achieved (as schematically illustrated in FIG. 13) by providing a gap between the cam surface (169) and cam member (160) to allow for a minimum displacement therebetween before cam engagement is achieved. This provides an additional benefit that once the support handle (20) is in between its two extra positions (as shown in FIG. 1 or FIG. 5) then the power tool cannot be actuated.

One of the benefits of this type of dual switch mechanism is that the main trigger switch (19) is not restrained from displacement if the secondary switch (172) has not been actuated and that release of either the trigger switch (19) or the switch (171) will result in displacement of the actuation branch (150) of the L shaped lever (140) out of engagement with the switch (128) thereby stopping the tool. This ensures that the user must maintain grip of both handles of the hedgetrimmer, Furthermore, as shown in the accompanying drawings, it will be appreciated that each of the arms (30) and (32) will have an actuator member (170) extending between the switch (171) and the U-shaped portion (174) of the horizontal bar (172), although in operation, one would be sufficient.

It will also be appreciated that the secondary switching mechanism could be disposed independent of the support handle (20), whereby a simple lever mechanism could, alternatively, be mounted on the clam shell and requiring manual operation to effect the longitudinal displacement of the horizontal bar (172), such lever simply providing an override safety feature to securely displace the horizontal bar (172) to an actuated position (i.e. to effect the cam engagement with the vertical bar (158) as described above) and then being restrained in this actuated position until subsequently released.

In a further alternative, the dual switching mechanism of the current embodiment could be replaced by a conventional lock-off mechanism to physically restrain the actuation of the trigger switch (19) unless the secondary switching member (171) has been actuated. This will provide a much more simplified dual switching mechanism whereby the trigger itself is adapted so as to able to directly engage the button switch (153) when depressed. However, such lock-off mechanisms could employ a restraint member biased into engagement with the trigger switch so as to prevent any pivotal movement thereof, whereby the restraint member may be subsequently disposed out of engagement with the trigger, upon actuation of a second switch member, to thereby allow the trigger switch to be operated. For example, the preferred embodiment described above is readily adaptable to employ a lock-off mechanism whereby the vertical bar (158) could be rigidly secured to the horizontal bar (172)—which remains displaceable in response to actuation member (170) as previously described—so that horizontal displacement of the vertical bar (158) and a projection thereon into and out of engagement with the trigger (19) is simply effected. Alternatively, a pivotal member could be displaced into or out of engagement with the trigger (19) upon pivotal displacement thereof by vertical displacement of the bar (158) as in the preferred embodiment.

Furthermore, whilst the preferred description of a hedge trimmer as described specific engagement mechanisms used to restrain the pivotal support handle (20) in a forward position such that its grip portion (22) extends forwards or in front of the main D shaped handle, or into a rearwardly disposed position so that the grip portion (22) extends rearwardly of the D-shaped handle (18), it is envisaged that a plurality of positions could be selectively chosen for the handle (22). For example, it is possible that the support handle (22) could have a plurality of forward positions in which the handle could be secured to allow the user to select that most appropriate and comfortable for their personal use. Here an alternative engagement means between the handle and body could be used such as, in its simplest form, a spring biased projection on the handle arms (30, 32) for snap engaging with any one of an array of recesses on the tool body at predetermined positions (disposed on an arc centred an the handle pivot axis (34)) to restrain the handle when engaged therewith. A simple release mechanism can then be employed to displace such projection when the handle is to be moved.

There are many other possible variations to this specific embodiment. For example, whilst the preferred embodiment provides for a link member (180) between the actuator means (170) in the handle and the bar (172) in the body to comprise a cylindrical bar co-axial with the pivot axis, this bar simply requires to have a link surface pivotally mounted about an axis which is co-axial with the handle pivot axis (34), and this surface to be received in an arcuate aperture (174) within the bar (172) such that the link surface itself is maintained in engagement with the arcuate aperture as it is pivoted about its axis. In this manner, as the actuator means (170) is displaced, the link element is still able to transmit an appropriate force to the bar (172).

Still further, the laterally displaceable link member (180) could alternatively be replaced by a splined cylinder (rotationally mounted co-axial with the handle pivot axis (34)), whereby the teeth of this cylinder are maintained in a rack and pinion engagement with both the actuator member (170) and also the bar (172). In this manner, as the actuator member (170) is displaced transversely to the splined cylinder, this cylinder is caused to rotate about axis (34) whereby the corresponding rack and pinion engagement with the bar (172) effects a complimentary sliding displacement thereof, such that actuation of the switch (171) effects mechanical displacement of the internal switching mechanism of the tool body. Here, means would additionally be provided to temporarily disengage the actuator member (170) from the splined cylinder during any pivotal displacement of the handle.

The invention claimed is:

1. A power tool comprising
a main body housing a motor and a tool drive assembly,
a tool connected to said tool drive assembly and extending from a first front end of said main body,
a first handle integrally formed on said main body remote from said front end, and restrained from displacement relative thereto,
a support handle, having a grip member, mounted on said main body and displaceable relative thereto,
wherein said support handle is pivotally mounted on said main body about a pivot axis so as to be pivotally displaceable from a first position in which said grip member is disposed forward of said first handle to a second position wherein said grip member is disposed rearwardly of said first handle,
restraining means engageable between said support handle and said main body for releasably restraining said support handle in either first or second positions, and wherein said restraining means comprises a first restraint means for restraining said support handle in said first position and a second restraint means, independent and remote from said first restraint means, for restraining said support handle in said second position.

2. A power tool as claimed in claim 1 wherein at least one of said first or second restraint means comprises a first engagement member mounted on one of said main body or support handle resiliently biased into engagement with a second engagement member on the other of the said main body or support handle.

3. A power tool as claimed in claim 2 wherein said at least one of said first and second restraint means comprises an actuation member for co-operation with said first engagement member which, when actuated, effects displacement of said first engagement member, against its resilient biasing, out of engagement with the second engagement member.

4. A power tool as claimed in claim 3 wherein said actuation member is mounted on the other of said main body or support handle on which said first engagement member is mounted.

5. A power tool as claimed in claim 3 wherein said actuation member is mounted on said one of said main body or support handle on which said first engagement member is mounted.

6. A power tool as claimed in claim 5 wherein said actuation member is formed integral with said first engagement member.

7. A power tool as claimed in claim 2 wherein said first engagement member comprises one of a shoulder or projection member and said second engagement member comprises the other of said shoulder or projection member for co-operative engagement between said projection member and said shoulder.

8. A power tool as claimed in claim 7 wherein said second engagement member comprises a deflecting means for engagement with said first engagement member as said support handle is pivoted relative to said main body from a non restrained position to a restrained position so as to displace said first engagement member against its resilient biasing and out of a relative pivotal displacement path of said other of the support handle or main body, until said shoulder and projection member are aligned in co-operating engagement.

9. A power tool as claimed in claim 2 wherein said at least one of said first and second restraint means has associated therewith a first stop member mounted on said support handle for abutment with a second stop member on said main body, wherein abutment of said first and second stop members at a predetermined position of said support handle relative to said body restrains the support handle from continued pivotal displacement about the body in one direction and effects alignment between said first and second engagement members.

10. A power tool comprising
a main body housing a motor and a tool drive assembly,
a tool connected to said tool drive assembly and extending from a first front end of said main body,
a first handle integrally formed on said main body remote from said front end, and restrained from displacement relative thereto,
a support handle, having a grip member, mounted on said main body and displaceable relative thereto,
wherein said support handle is pivotally mounted on said main body about a pivot axis so as to be pivotally displaceable from a first position in which said grip member is disposed forwards of said first handle to a second position wherein said grip member is disposed rearwardly of said first handle,
restraining means engageable between said support handle and said main body for releasably restraining said support handle in either first or second positions, and wherein said restraining means is engageable between said support handle and said main body, and is independent and eccentric from said pivot axis.

11. A power tool as claimed in claim 10 wherein said restraining means includes a first restraint means and a second restraint means, wherein said first restraint means is engageable between said support handle and said main body at a position forward of said pivot axis and said second restraint means is engageable between said support handle and said main body in a position rearward of said pivot axis.

12. A power tool as claimed in claim 11 wherein said first handle comprises a manually operable trigger switch engageable with an electrical switch to provide power to said motor.

13. A power tool as claimed in claim 12 comprising a two handed switching mechanism for facilitating operation of said electrical switch.

14. A power tool as claimed in claim 13 wherein said trigger switch comprises a displaceable switch member for effecting engagement between said trigger switch and said electrical switch, which switch member being displaceable from a biased inoperative position, whereby it is selectively restrained from engagement with said electrical switch during operation of said trigger switch, to an operative position in which it is engageable with said electrical switch during operation of said trigger switch.

15. A power tool as claimed in claim 14 wherein said displaceable switch member is pivotally mounted on said trigger switch.

16. A power tool as claimed in claim 15 having a dual switching mechanism, said dual switching mechanism comprising said trigger switch and a secondary switch member remote from said trigger switch, which secondary switch member being manually displaceable from a first unactuated position to a second actuated position, wherein said secondary switch member co-operates with said trigger switch so as to facilitate engagement between said trigger switch and said electrical switch when in an actuated position.

17. A power tool as claimed in claim 16 wherein said secondary switch member co-operates with said displaceable switch member to displace this displaceable switch member from said inoperative position to said operative position when said secondary switch member is displaced from said unactuated position to its actuated position.

18. A power tool as claimed in claim 16 wherein said dual switching mechanism comprises a lock-off member for co-operating engagement with said trigger switch to restrain such trigger switch from displacement when said secondary switch member is in an unactuated position, which lock-off member being displaceable out of engagement with said trigger switch when said secondary switch member is in an actuated position.

19. A power tool as claimed in claim 18 wherein said secondary switch member is mounted on said support handle and is maintained in co-operation with said trigger switch when said support handle is in both said first and second position relative to the main body.

20. A power tool as claimed in claim 19 wherein said dual switching mechanism comprises a first force transmission means in said support handle which is maintained in communication with said secondary switch member, and a secondary force transmission means in said body which is maintained in communication with said trigger switch, wherein a pivotally mounted link element is connected to and extends between said first and second force transmission means so as to be co-axial with said pivot axis and for effecting transfer of an actuation force.

21. A power tool as claimed in claim 20 wherein said link element comprises a cylindrical bar member co-incident with said pivot axis.

22. A power tool as claimed in claim 21 wherein said link element is displaceable transverse to said pivot axis.

23. A power tool as claimed in claim 22 wherein said secondary force transmission means comprises an elongate cam member which is displaceable in either a first or second transverse direction with respect to said pivot axis and in response to the transfer of an actuation force by said link element.

24. A power tool as claimed in claim 23 wherein said cam member is displaceable in a first direction in response to an actuation force from said secondary switch member when said support handle is in said first position and is displaceable in a second direction in response to an actuation force from said secondary switch member when support handle is in said second position.

25. A power tool as claimed in claim 24 in which said dual switching mechanism comprises a cam follower member biased into engagement with a cam surface of said cam member, wherein cam engagement therebetween as said cam member is displaced effects cam displacement of said cam follower member in the same direction irrespective of whether the cam member is displaced in said first or second direction.

26. A power tool as claimed in claim 25 wherein said cam surface is symmetrical.

27. A power tool as claimed in claim 26 wherein said cam follower member co-operates with said trigger switch.

28. A power tool as claimed in claim 26 wherein said cam follower member cooperates with said displaceable switch member.

29. A power tool as claimed in claim 28 wherein said cam follower member is displaceable, in response to said cam engagement with the cam member, from a rest position, in which it is restrained from active engagement with said displaceable switch member, into a second active position so as to engage with and effect displacement of said displaceable switch member into an operative position.

30. A power tool as claimed in claim 29 wherein said displaceable switch member is L-shaped, having a first free end for engagement with said electrical switch and an opposed free end thereof for engagement with said cam follower member.

31. A power tool as claimed in claim 30 wherein said cam follower member comprises an elongate slot for receiving said opposed free end of said displaceable switch member so as to be freely displaceable within said slot when said cam follower member is in said rest position, and which elongate slot comprises a shoulder which engages said opposed end when said cam follower member is in said second active position to restrain movement of the opposed end relative thereto.

32. A power tool as claimed claim 23 wherein said cam member co-operates directly with said trigger switch.

33. A power tool as claimed in claim 32, wherein said power tool has its centre of gravity disposed adjacent to said first or second restraint means mounted on said main body.

34. A power tool as claimed in claim 33, wherein said support handle is U-shaped having two arms one each extending along opposed sides of said main body, and said first restraint means comprises first or second engagement members mounted on said body, one each disposed either side of said body for effecting engagement with each of said arms, wherein said centre of gravity is disposed between said first or second engagement members.

35. A power tool comprising
a main body housing a motor and a tool drive assembly,
a tool connected to said tool drive assembly and extending from a first front end of said main body,
a first handle integrally formed on said main body remote from said front end, and restrained from displacement relative thereto,
a second support handle, having a grip member, pivotally mounted about a pivot axis on said main body so as to be pivotally displaceable relative thereto, wherein said second support handle comprises a switch member displaceable from an unactuated position to an actuated position, said switch member being maintained in mechanical co-operation with a switch engagement means within the body when said second support handle is in a plurality of different pivotal positions about said pivot axis, whereby displacement of said switch member effects mechanical displacement of said switch engagement means at any one of said plurality of different pivotal positions of said second support handle, and
wherein said switch engagement means co-operates with a primary trigger switch on said first handle when said switch member is in said actuated position to allow said trigger switch to effect electrical connection between a tool power source and said motor.

36. A power tool as claimed in claim 35 wherein said mechanical co-operation between said switch member and said switch engagement means is effected by a pivotally mounted link element which extends between said second support handle and said body so as to be co-axial with said pivot axis.

37. A power tool as claimed in claim 36 wherein said link element comprises a cylindrical bar member co-incident with said pivot axis.

38. A power tool as claimed in claim 37 wherein said switch member comprises a first force transmission means in said second support handle, and said switch engagement means comprises a second force transmission means in said body, wherein said link element extends between said first and second force transmission means.

39. A power tool as claimed in claim 38 wherein said link element is displaceable transverse to said pivot axis.

40. A power tool as claimed in claim 35 in which said tool drive assembly has a linear reciprocating output for driving a cutting element.

41. A power tool as claimed in claim 35 comprising a hedge trimmer.

42. A power tool as claimed in claim 35 comprising a chain saw.

* * * * *